(12) United States Patent
Izawa

(10) Patent No.: US 12,494,636 B2
(45) Date of Patent: Dec. 9, 2025

(54) POWER SUPPLY REDUNDANCY SYSTEM

(71) Applicant: YAZAKI CORPORATION, Tokyo (JP)

(72) Inventor: Takaaki Izawa, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 18/736,451

(22) Filed: Jun. 6, 2024

(65) Prior Publication Data

US 2024/0429707 A1 Dec. 26, 2024

(30) Foreign Application Priority Data

Jun. 23, 2023 (JP) ................................. 2023-103126

(51) Int. Cl.
*H02J 1/08* (2006.01)
(52) U.S. Cl.
CPC .................... *H02J 1/086* (2020.01)
(58) Field of Classification Search
CPC ........ H02J 1/086; H02J 2310/46; H02J 9/061; H02J 9/06; B60R 16/033
See application file for complete search history.

(56) References Cited

U.S. PATENT DOCUMENTS

| | | | |
|---|---|---|---|
| 2012/0001588 A1 | 1/2012 | Kita | |
| 2014/0176053 A1 | 6/2014 | Kita | |
| 2019/0115176 A1* | 4/2019 | Yasunori | ................. B60R 16/03 |
| 2020/0313457 A1* | 10/2020 | Kozuki | ................. H02J 7/0047 |
| 2021/0237670 A1* | 8/2021 | Takahara | ................. H02J 9/06 |
| 2021/0242712 A1* | 8/2021 | Izawa | ................. B60R 16/033 |

FOREIGN PATENT DOCUMENTS

| | | |
|---|---|---|
| JP | 2012-16222 A | 1/2012 |
| JP | 2015-77036 A | 4/2015 |
| JP | 2018-98949 A | 6/2018 |
| JP | 2021-119728 A | 8/2021 |

\* cited by examiner

*Primary Examiner* — Lincoln D Donovan
*Assistant Examiner* — Alex W Lam
(74) *Attorney, Agent, or Firm* — KENEALY VAIDYA LLP

(57) ABSTRACT

A power supply redundancy system includes a main battery that supplies power to a first load unit and a second load unit, a sub-storage that supplies power to at least the second load unit, a switching unit that switches a power supply path from the main battery and the sub-storage to the first load unit and the second load unit, a control board on which a switching control unit is mounted, the switching control unit for switching and controlling the switching unit, and a housing that accommodates at least the main battery, the sub-storage, and the switching unit. The control board is operable by receiving power supply from both the main battery and the sub-storage.

5 Claims, 18 Drawing Sheets

POWER SUPPLY REDUNDANCY SYSTEM

CROSS-REFERENCE TO RELATED APPLICATIONS

This application is based on and claims priority under 35 USC 119 from Japanese Patent Application No. 2023-103126 filed on Jun. 23, 2023, the contents of which are incorporated herein by reference.

TECHNICAL FIELD

The invention relates to a power supply redundancy system.

BACKGROUND ART

In the related art, there has been a power supply redundancy system that is mounted on a vehicle and supplies power from a sub-battery to a load when a main battery is abnormal or the like. As such a power supply redundancy system, there has also been a system including a first load unit including an auxiliary device such as an air conditioner device or car navigation equipment, in addition to a function necessary for vehicle traveling, and a second load unit for performing a degenerated function such as at least evacuating the vehicle to a safe place when power cannot be supplied to the first load unit, and having a redundant configuration for a load (see Patent Literature 1).

CITATION LIST

Patent Literature

Patent Literature 1: JP2021-119728A

SUMMARY OF INVENTION

However, in the power supply redundancy system disclosed in Patent Literature 1, a main battery, a sub-battery, and a switching unit that switches power supply paths from the main battery and the sub-battery are separately provided, and the main battery, the sub-battery, and the switching unit are connected by a wire harness that is thick and difficult to bend. Therefore, it is necessary to dispose these three elements at a distance due to the bending of the wire harness, and there is a limit in close disposition, making it difficult to reduce a size of the power supply redundancy system.

A battery pack in the related art is mounted with a control circuit for controlling a switching unit, and the control circuit is supplied with power from an inside of the battery pack. Therefore, a redundant configuration is not incorporated into the control circuit, and when a problem occurs in power supply to the control circuit, appropriate protection cannot be executed by the power supply redundancy system.

The invention is made to solve such a problem in the related art. An object of the invention is to provide a power supply redundancy system that is reduced in size and capable of providing more appropriate protection.

A power supply redundancy system of the present invention includes a main battery that supplies power to a first load unit and a second load unit, a sub-storage that supplies power to at least the second load unit, a switching unit that switches a power supply path from the main battery and the sub-storage to the first load unit and the second load unit, a control board on which a switching control unit is mounted, the switching control unit for switching and controlling the switching unit, and a housing that accommodates at least the main battery, the sub-storage, and the switching unit. The control board is operable by receiving power supply from both the main battery and the sub-storage.

According to the invention, it is possible to provide the power supply redundancy system that is reduced in size and capable of providing more appropriate protection.

DESCRIPTION OF EMBODIMENTS

Hereinafter, the invention will be described with reference to preferred embodiments. The invention is not limited to the embodiments to be described below, and the embodiments can be appropriately changed without departing from the scope of the invention. In the embodiments described below, there may be portions in which illustration and description of a part of a configuration are omitted, and it is needless to say that a known or well-known technique is appropriately applied to the details of an omitted technique within a range in which no contradiction with the contents described below occurs.

Figure 1:
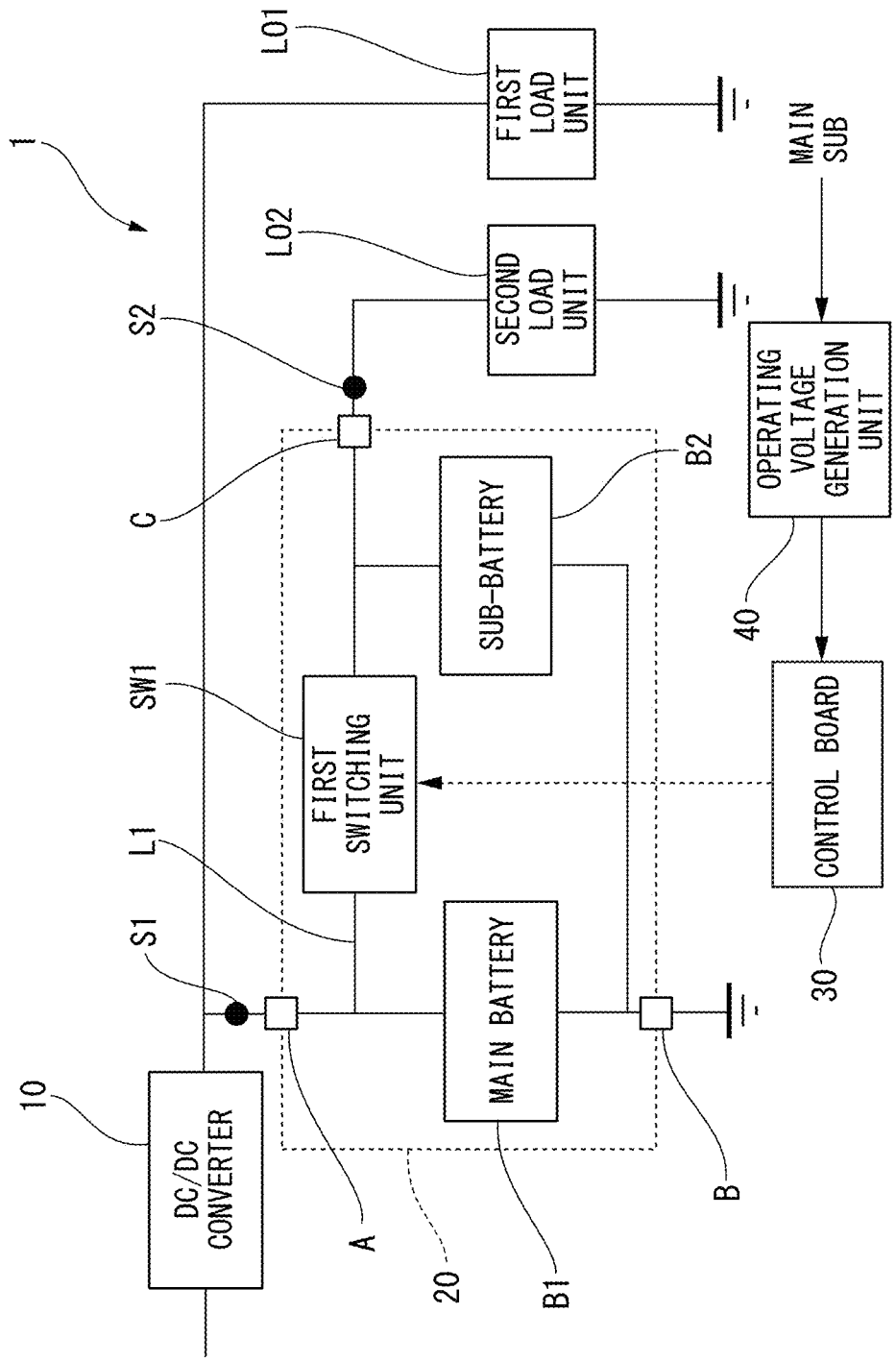
FIG. 1 is a block diagram showing a power supply redundancy system according to an embodiment of the invention.

FIG. 1 is a block diagram showing a power supply redundancy system according to a first embodiment of the invention. As shown in FIG. 1, a power supply redundancy system 1 is mounted on an electric vehicle or the like that performs autonomous driving, and can supply power to a first load unit LO1 and a second load unit LO2. In the power supply redundancy system 1, the first load unit LO1 includes loads that are essential for traveling of a vehicle, such as a steering device and a brake device, and a load corresponding to an auxiliary device such as an air conditioner and an audio device. The second load unit LO2 is implemented by loads that are essential for traveling of the vehicle, such as a steering device and a brake device. For example, when the power supply redundancy system 1 according to the present embodiment is mounted on an autonomous driving vehicle, autonomous driving is normally performed by supplying power to the first load unit LO1. On the other hand, at the time of an abnormality in a main battery (see reference sign B1) or the like to be described later, the power supply redundancy system 1 supplies power to the second load unit LO2 and performs autonomous driving, for example, to evacuate the vehicle to a safe place.

The first load unit LO1 and the second load unit LO2 are not particularly limited to the above-described example as long as the second load unit LO2 exhibits a function more degenerated than the first load unit LO1. In the following description, an example will be described in which the power supply redundancy system 1 is mounted on an autonomous driving vehicle, and the first load unit LO1 and the second load unit LO2 are as described above.

The power supply redundancy system 1 includes, in addition to the first load unit LO1 and the second load unit LO2, a DC/DC converter (step-down unit) 10, a twin battery 20, a control board 30, an operating voltage generation unit 40, and sensors S1 and S2. The twin battery 20 includes the main battery B1, a sub-battery (sub-storage) B2, and a first switching unit SW1.

The DC/DC converter 10 receives a voltage (several 100 V, 48 V, or the like) higher than that of the main battery B1 and the sub-battery B2, and steps down the voltage. The DC/DC converter 10 is connected to the first load unit LO1, and can supply the step-down power to the first load unit LO1.

Figure 2:
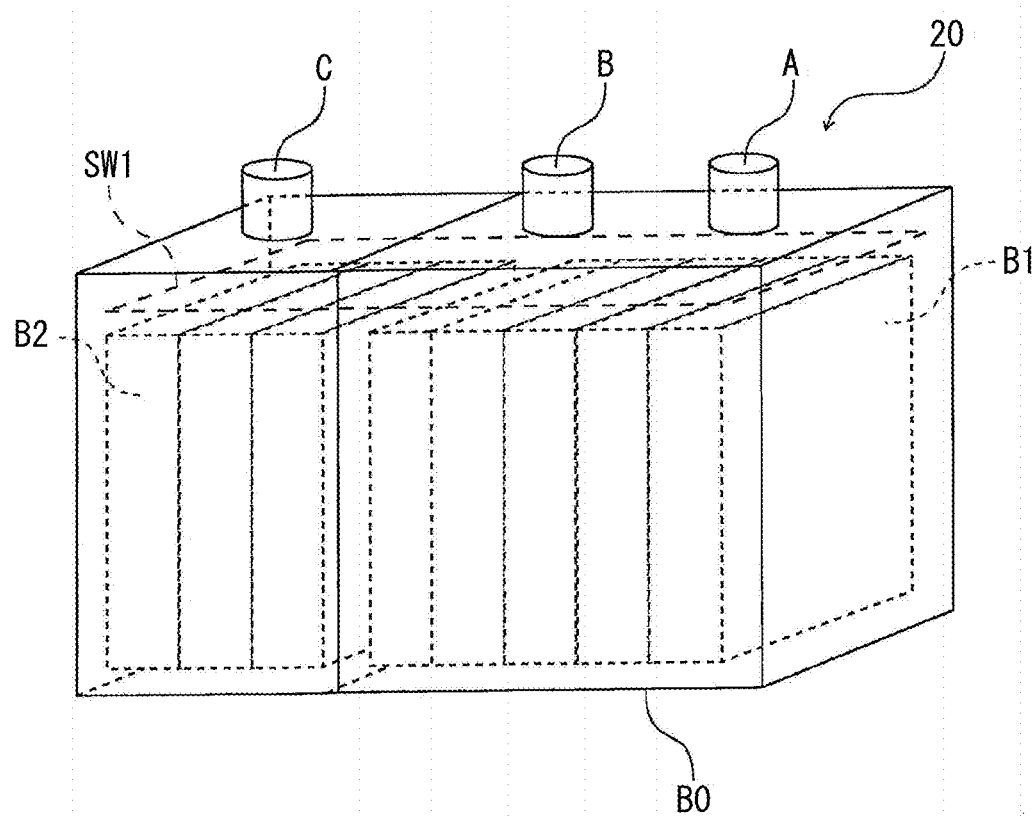
FIG. 2 is a perspective view showing a twin battery shown in FIG. 1.

FIG. 2 is a perspective view showing the twin battery 20 shown in FIG. 1. As shown in FIG. 2, the twin battery 20 includes, in addition to the main battery B1, the sub-battery B2, and the first switching unit SW1, terminals A to C, and a housing BO that houses at least the main battery B1, the sub-battery B2, and the first switching unit SW1.

In the twin battery 20, the terminal A is connected to the DC/DC converter 10, and the terminal B is connected to ground. The terminal C is connected to the second load unit LO2. The terminal A in the twin battery 20 is connected to a positive electrode side of the main battery B1. The terminal B is connected to negative electrode sides of the main battery B1 and the sub-battery B2. The terminal C is connected to a positive electrode side of the sub-battery B2. The first switching unit SW1 is provided on a connection line L1 that connects the positive electrode side of the main battery B1 and the positive electrode side of the sub-battery B2. The main battery B1, the sub-battery B2, and the first switching unit SW1 are put into a switching state by, for example, a busbar that allows a large current.

The main battery B1 is implemented by a rechargeable secondary battery. The main battery B1 is connected to the DC/DC converter 10 via the terminal A, and can store electricity using power from the DC/DC converter 10 at a timing other than during autonomous driving, for example. The main battery B1 is connected to the first load unit LO1, and is also connected to the second load unit LO2 via the first switching unit SW1 and the terminal C. Therefore, the main battery B1 according to the present embodiment can supply power to both the first load unit LO1 and the second load unit LO2.

Similarly to the main battery B1, the sub-battery B2 is implemented by a rechargeable secondary battery. The sub-battery B2 may be of the same type and capacity as the main battery B1, or may be of a different type or capacity. The sub-battery B2 is connected to the second load unit LO2 via the terminal C. Therefore, the sub-battery B2 according to the present embodiment can supply power to the second load unit LO2. Since the sub-battery B2 is also connected to the first load unit LO1 via the first switching unit SW1 and the terminal A, the sub-battery B2 may supply power to the first load unit LO1. In addition, the sub-battery B2 may store electricity using power from the DC/DC converter 10 at a timing other than during autonomous driving.

The first switching unit SW1 is implemented by a switch such as a semiconductor. The first switching unit SW1 can be changed between an open state and a closed state according to an instruction from the control board 30.

The plurality of sensors S1, S2 detect at least one abnormality in the main battery B1 and the sub-battery B2. The first sensor S1 detects an abnormality in the DC/DC converter 10 or the main battery B1, and is implemented by, for example, a voltage sensor externally attached to a vicinity of the terminal A. The second sensor S2 detects an abnormality in the sub-battery B2 or the second load unit LO2, and is, for example, a voltage sensor externally attached to a vicinity of the terminal C. The first sensor S1 and the second sensor S2 transmit sensor signals corresponding to detected voltage values to the control board 30.

The first sensor S1 and the second sensor S2 are not limited to the voltage sensors, and may be further implemented by current sensors. In particular, in the vicinity of the terminal C, when a short-circuit failure or the like occurs in the second load unit LO2, a current change occurs earlier than a voltage change, so it is preferable that the second sensor S2 is configured to include a current sensor. Further, the sensors S1 and S2 are externally attached to the twin battery 20, but are not particularly limited to being externally attached to the twin battery 20, and are preferably built in. This is because when the sensors S1 and S2 are built in, switching control over the first switching unit SW1 can be executed more quickly by using an analog operation. Further, the first switching unit SW1 is not limited to the case of being switched by the analog operation, and may be switched by a microcomputer operation.

The control board 30 is for controlling the power supply redundancy system 1. In the present embodiment, the control board 30 is configured to operate by receiving power supply from both the main battery B1 and the sub-battery B2. In the present embodiment, the control board 30 is provided outside the appearance housing BO constituting the twin battery 20. However, the invention is not particularly limited thereto, and the control board 30 may be provided within the housing BO as one element of the twin battery 20.

The operating voltage generation unit 40 generates an operating voltage (for example, 5 V) for the control board 30, and is implemented by a regulator using an OR circuit. The operating voltage generation unit 40 generates an operating voltage for the control board 30 in a state in which power is supplied from at least one of the main battery B1 and the sub-battery B2. The operating voltage generation unit 40 is also provided outside the appearance housing BO constituting the twin battery 20. However, the invention is not particularly limited thereto, and the control board 30 may be provided within the housing BO as one element of the twin battery 20.

Figure 3:
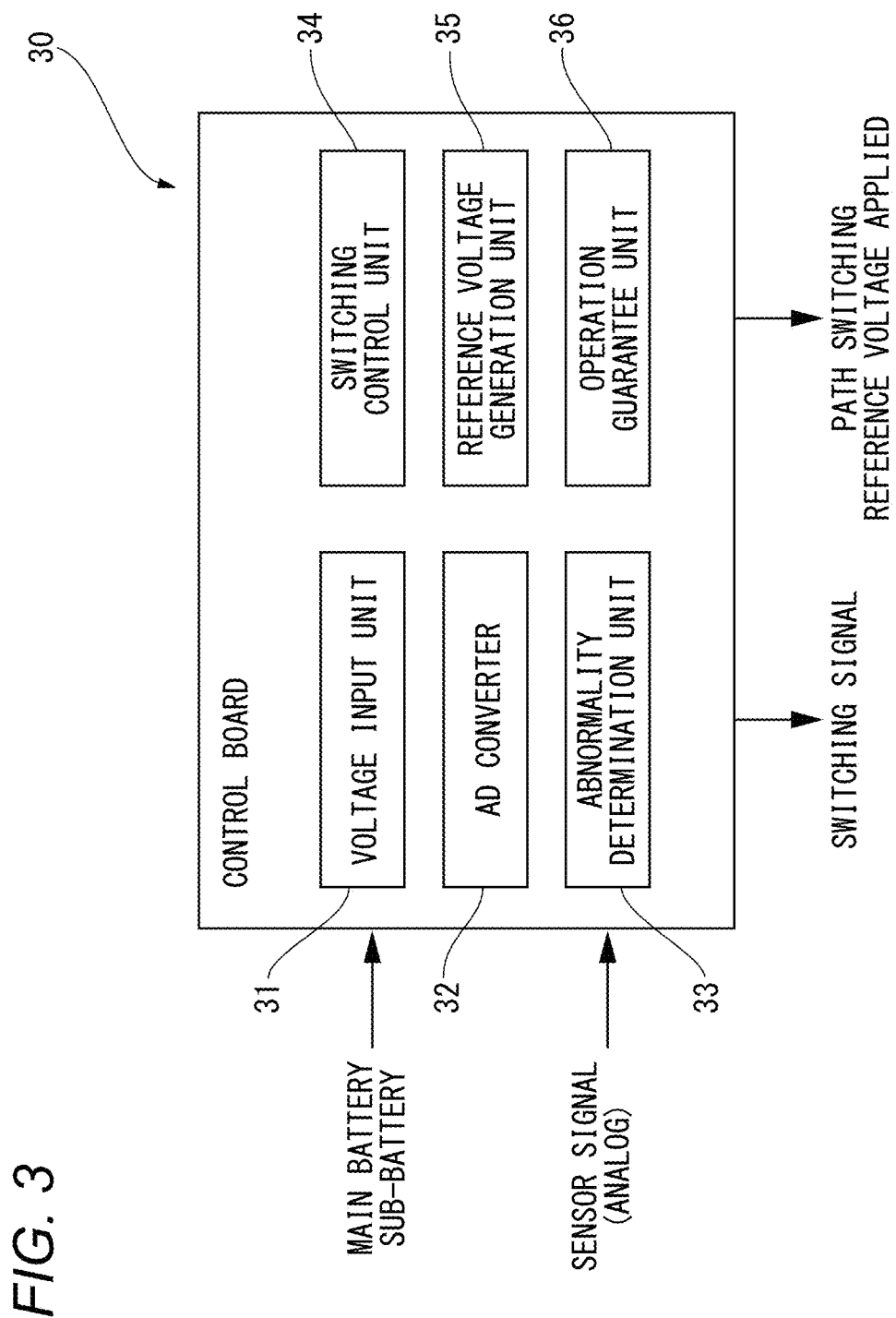
FIG. 3 is a block diagram showing details of a control board shown in FIG. 1.

FIG. 3 is a block diagram showing details of the control board 30 shown in FIG. 1. As shown in FIG. 3, the control board 30 includes a voltage input unit 31, an AD converter 32, an abnormality determination unit 33, a switching control unit 34, a reference voltage generation unit 35, and an operation guarantee unit 36.

The voltage input unit 31 is implemented to receive the operating voltage from the operating voltage generation unit 40. Each functional unit of the control board 30 operates by receiving power from the voltage input unit 31.

The AD converter 32 receives analog sensor signals from the plurality of sensors S1 and S2 and digitalizes the analog sensor signals. The abnormality determination unit 33 determines an abnormality based on the sensor signal digitized by the AD converter 32. In the present embodiment, when the sensor signal from the first sensor S1 is an abnormal value, the abnormality determination unit 33 determines that the main battery B1 or the DC/DC converter 10 is in an abnormal state. When the sensor signal from the second sensor S2 is an abnormal value, the abnormality determination unit 33 determines that the sub-battery B2 or the second load unit LO2 is in an abnormal state. The abnormality determination unit 33 is not limited to a case of performing abnormality determination based on the sensor signal digitized by the AD converter 32, and preferably performs abnormality determination using an analog circuit, such as performing abnormality determination when an analog sensor signal is input by a comparator and exceeds a determination threshold value. This is because it is easier to respond immediately when an abnormality is determined when an analog circuit is used.

The switching control unit 34 performs switching control over the first switching unit SW1. By the switching control unit 34 switching the first switching unit SW1, at least one of the first load unit LO1 and the second load unit LO2 can be operated, and for example, a minimum limit function related to autonomous driving is ensured.

The reference voltage generation unit 35 is a functional unit that generates a reference voltage. The operation guarantee unit 36 guarantees an operation of the sensors S1 and S2. The operation guarantee unit 36 has a function of, for example, disconnecting the sensors S1 and S2 from a path shown in FIG. 1 and applying only a reference voltage to the sensors S1 and S2. In a state where only the reference voltage is applied, sensor signals corresponding to the reference voltages are to be output from the sensors S1 and S2. The operation guarantee unit 36 checks whether the sensor signal corresponding to the reference voltage is output at this time, and determines whether the sensors S1 and S2 operate appropriately. When the operation guarantee unit 36 determines that the sensors S1 and S2 do not operate appropriately, a predetermined warning or the like is issued. The reference voltage generated by the reference voltage generation unit 35 is also used as the reference voltage for the AD converter 32, for example.

Figure 4:
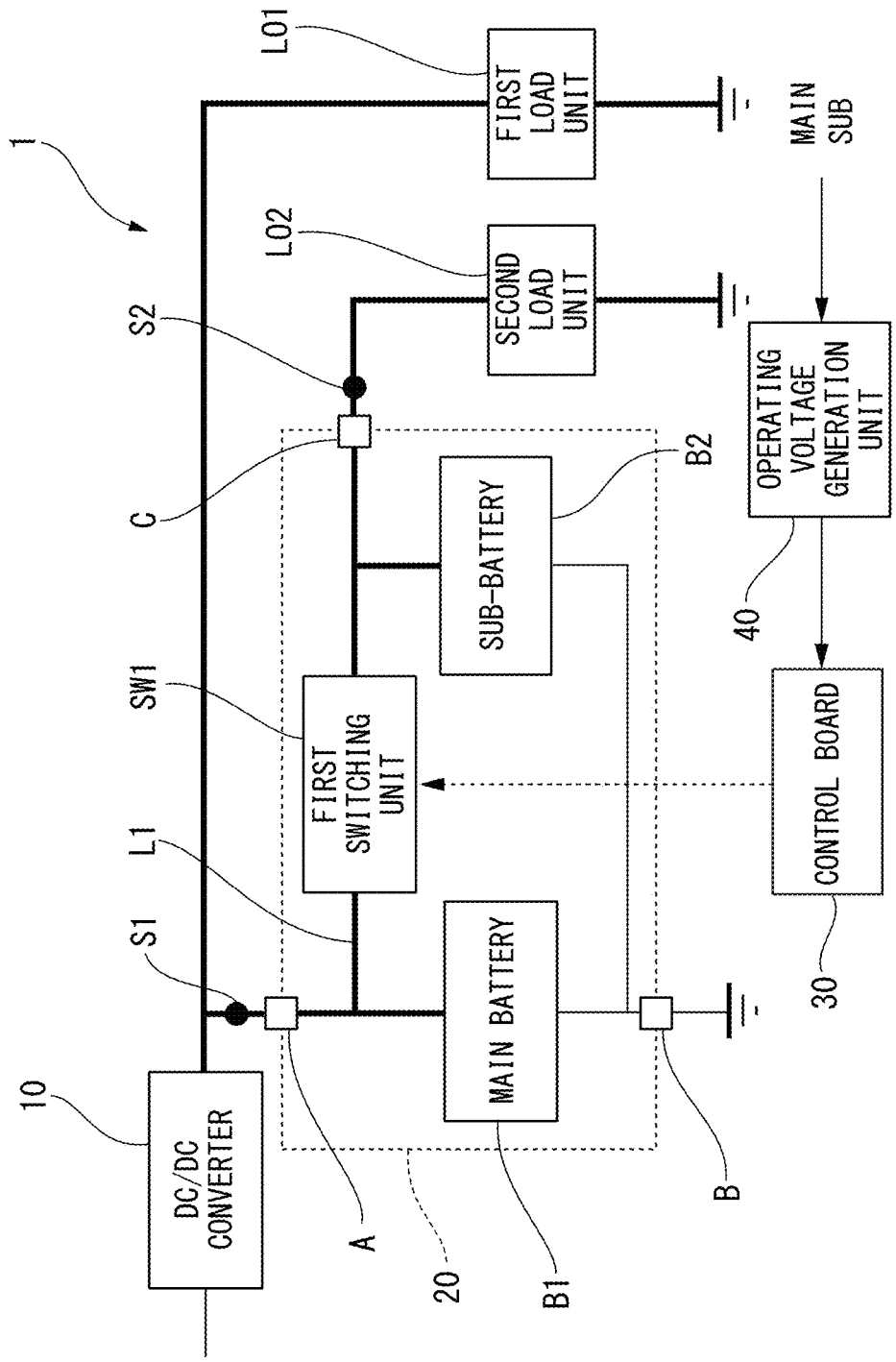
FIG. 4 is a block diagram showing an operation of the power supply redundancy system according to the present embodiment, and shows an example in a normal state.
Figure 5:
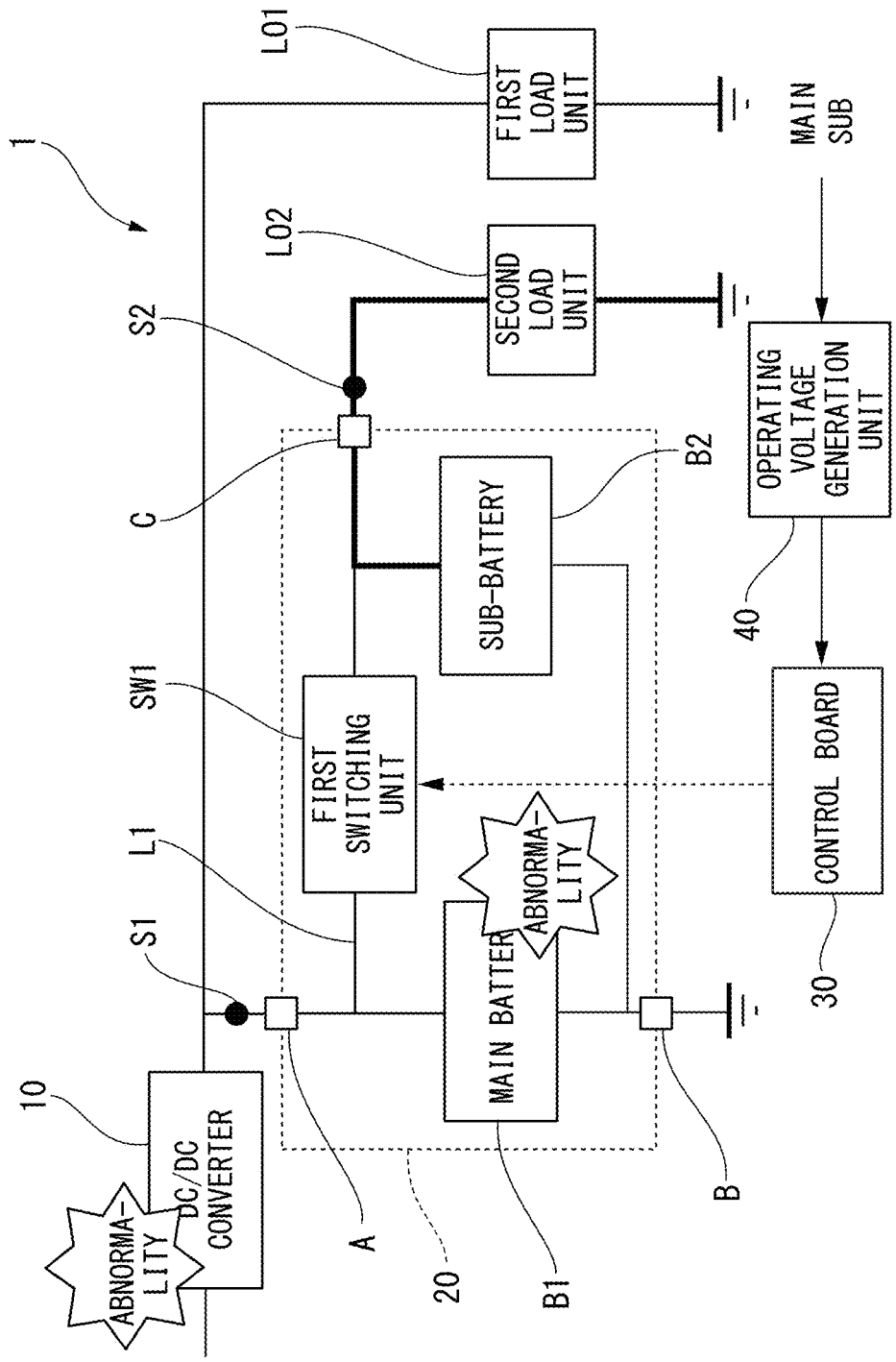
FIG. 5 is a block diagram showing an operation of the power supply redundancy system according to the present embodiment, and shows an example when a main battery or a DC/DC converter is in an abnormal state.
Figure 6:
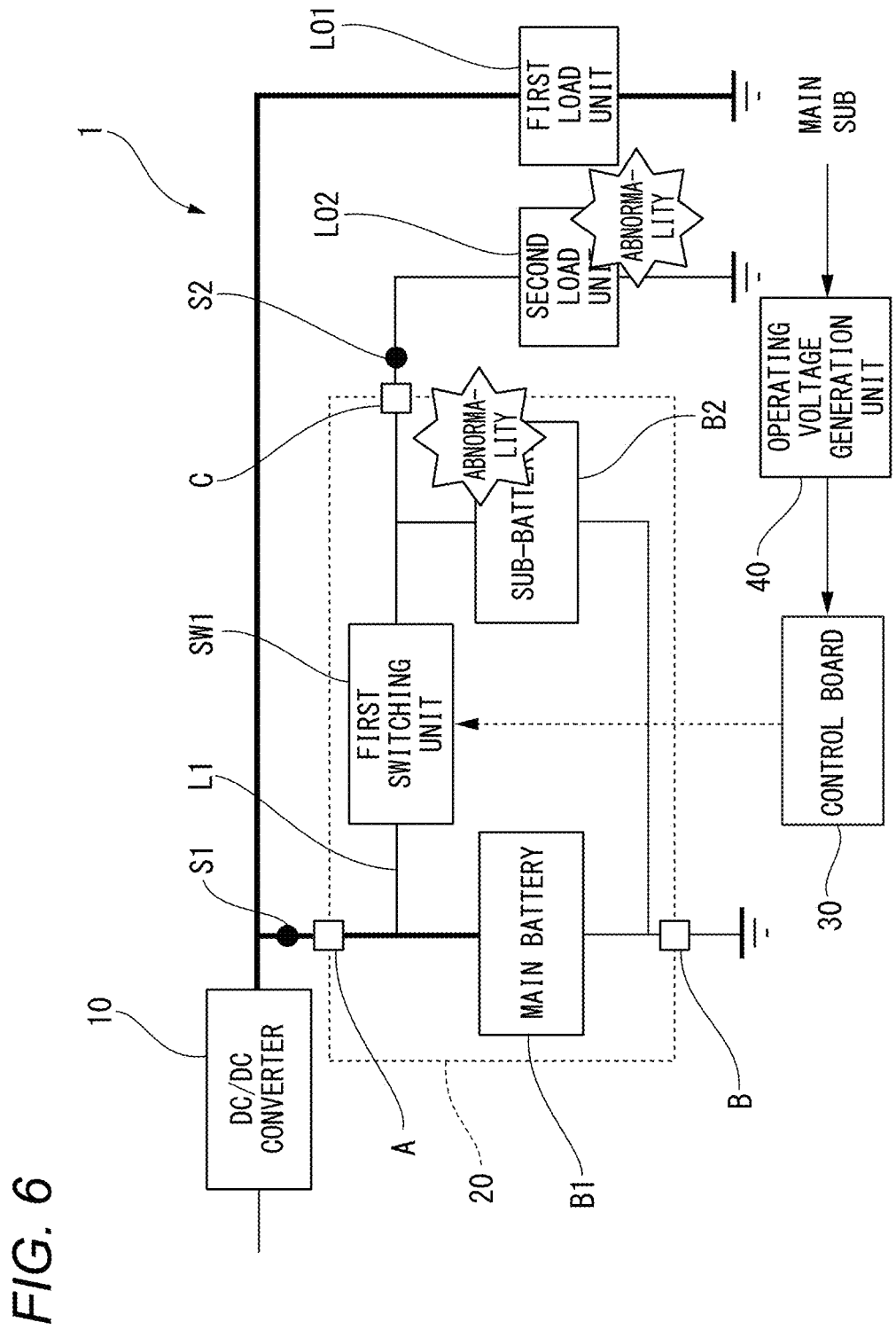
FIG. 6 is a block diagram showing an operation of the power supply redundancy system according to the present embodiment, and shows an example when a sub-battery or a second load unit is in an abnormal state.

Next, an operation of the power supply redundancy system 1 according to the present embodiment will be described. FIGS. 4 to 6 are block diagrams showing the operation of the power supply redundancy system 1 according to the present embodiment. FIG. 4 shows an example in a normal state. FIG. 5 shows an example when the main battery B1 or the DC/DC converter 10 is in an abnormal state. FIG. 6 shows an example in which the sub-battery B2 or the second load unit LO2 is in an abnormal state. In FIGS. 4 to 6, thick line portions indicate a flow of current.

First, as shown in FIG. 4, it is assumed that the DC/DC converter 10, the main battery B1, the sub-battery B2, and the like are in a normal state in which there is no abnormality. In this case, the switching control unit 34 closes the first switching unit SW1. In this state, power can be supplied from the DC/DC converter 10 and the main battery B1 to the first load unit LO1 and the second load unit LO2. Further, power can also be supplied from the sub-battery B2 to the second load unit LO2. Power may be supplied from the sub-battery B2 to the first load unit LO1.

As shown in FIG. 5, it is assumed that an abnormality such as a short-circuit failure occurs in the DC/DC converter 10 or the main battery B1. In this case, the switching control unit 34 opens the first switching unit SW1. In this state, since an abnormality occurs in the DC/DC converter 10 or the main battery B1, power cannot be supplied to the first load unit LO1, but power is supplied to the second load unit LO2 by the sub-battery B2. Accordingly, it is possible to drive the second load unit LO2 and execute a minimum operation or the like related to the autonomous driving.

As shown in FIG. 6, it is assumed that an abnormality such as a short-circuit failure occurs in the sub-battery B2 or the second load unit LO2. In this case as well, the switching control unit 34 opens the first switching unit SW1. In this state, a process of disconnecting the sub-battery B2 in which an abnormality occurs is performed. Accordingly, the first load unit LO1 can be supplied with power from the DC/DC converter 10 or the main battery B1 without being affected by the abnormality on the sub-battery B2 side, and autonomous driving or the like can be executed.

Next, an operation of the power supply redundancy system 1 according to the present embodiment will be described. First, in the power supply redundancy system 1 according to the present embodiment, the main battery B1, the sub-battery B2, and the first switching unit SW1 are connected by a busbar or the like, and are housed in the same housing BO. Therefore, it is not necessary to connect these three elements with a wire harness having a large diameter. Therefore, it is not necessary to ensure a distance between the three elements due to an influence of the wire harness having a large diameter, and a size of the power supply redundancy system 1 is reduced.

Further, in the example shown in FIG. 5 as described above, an abnormality occurs on the main battery B1 side, but the sub-battery B2 is normal. Thus, the operating voltage generation unit 40 provides an operating voltage to the control board 30 through the sub-battery B2. Similarly, in the example shown in FIG. 6, an abnormality occurs on the sub-battery B2 side, but the main battery B1 is normal. Thus, the operating voltage generation unit 40 provides an operating voltage to the control board 30 through the main battery B1. Therefore, the control board 30 also has a redundant configuration, which contributes to more appropriate protection.

In this way, according to the power supply redundancy system 1 in the first embodiment, since the main battery B1, the sub-battery B2, and the first switching unit SW1 are housed in the same housing BO, it is not necessary to connect the main battery B1, the sub-battery B2, and the first switching unit SW1 with a wire harness having a large diameter, and it is possible to reduce the size. Since the control board 30 is operable by receiving power supply from both the main battery B1 and the sub-battery B2, a redundant configuration is also applied to a control circuit. As a result, even when the power supply from one side is cut off, the control board 30 can operate the first switching unit SW1 by the power supply from the other side, and more appropriate protection can be achieved. Accordingly, it is possible to reduce the size and to achieve more appropriate protection.

Further, it is determined whether the sensors S1 and S2 operate appropriately based on the sensor signals when only the reference voltage is applied to the sensors S1 and S2. Therefore, for example, when the vehicle is stopped, it is possible to guarantee an operation of the sensors S1 and S2 by applying a reference voltage to the sensors S1 and S2 and checking whether a sensor signal corresponding to the reference voltage is obtained.

Next, a second embodiment according to the invention will be described. A power supply redundancy system according to the second embodiment is similar as that of the first embodiment, except for a part of a configuration and operation. Hereinafter, differences from the first embodiment will be described.

Figure 7:
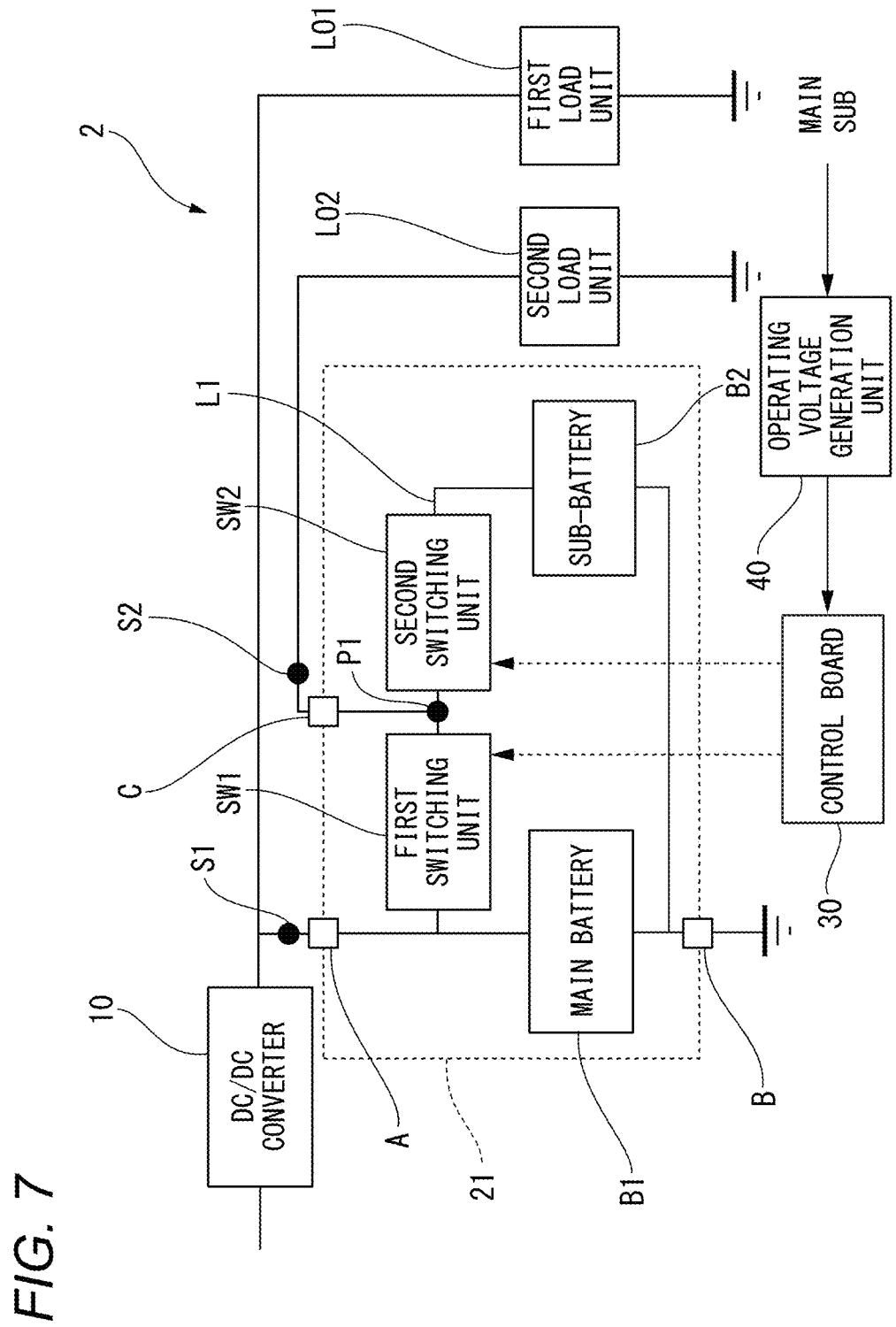
FIG. 7 is a block diagram showing a power supply redundancy system according to a second embodiment.

FIG. 7 is a block diagram showing the power supply redundancy system according to the second embodiment. Unlike the twin battery 20 according to the first embodiment, a twin battery 21 according to the second embodiment has two switching units SW1, SW2.

The twin battery 21 according to the second embodiment will be described in detail. The twin battery 21 according to the second embodiment includes the first switching unit SW1 and the second switching unit SW2 on the connection line L1 that connects the positive electrode side of the main battery B1 and the positive electrode side of the sub-battery B2. Of the two switching units SW1 and SW2, the main battery B1 side is the first switching unit SW1, and the sub-battery B2 side is the second switching unit SW2. Both the switching units SW1 and SW2 are controlled to be switched between an open state and a closed state by the switching control unit 34 of the control board 30. In the second embodiment, the terminal C is connected to a connection point P1 located between the first switching unit SW1 and the second switching unit SW2.

Further, in the second embodiment, the sub-battery B2 includes an abnormality detection unit that detects an abnormality in the sub-battery B2, and transmits the information to the control board 30 when the abnormality is detected. Therefore, the abnormality determination unit 33 of the control board 30 can determine three types of abnormalities, that is, an abnormality in the DC/DC converter 10 or the main battery B1, an abnormality in the sub-battery B2, and an abnormality in the second load unit LO2.

Next, an operation of the power supply redundancy system 2 according to the second embodiment will be described with reference to FIG. 7. First, it is assumed that the DC/DC converter 10, the main battery B1, the sub-battery B2, and the like are in a normal state in which there is no abnormality. In this case, the switching control unit 34 closes the first switching unit SW1 and opens the second switching unit SW2. Accordingly, power can be supplied from the DC/DC converter 10 and the main battery B1 to the first load unit LO1 and the second load unit LO2. On the other hand, the sub-battery B2 is disconnected from the first load unit LO1 and the second load unit LO2, and power cannot be supplied from the sub-battery B2 to the first load unit LO1 and the second load unit LO2.

The switching control unit 34 may close the second switching unit SW2 to enable power to be supplied from the sub-battery B2 to the first load unit LO1 and the second load unit LO2. In this case, when there is a voltage difference between the main battery B1 and the sub-battery B2, a current flows from one of the main battery B1 and the sub-battery B2 to the other. Therefore, when the second switching unit SW2 is closed, the power supply redundancy system 2 includes a backflow prevention circuit that prevents such a flow.

It is assumed that an abnormality such as a short-circuit failure occurs in the DC/DC converter 10 or the main battery B1. In this case, the switching control unit 34 opens the first switching unit SW1 and closes the second switching unit SW2. In this state, since an abnormality occurs in the DC/DC converter 10 or the main battery B1, power cannot be supplied to the first load unit LO1, but power is supplied to the second load unit LO2 by the sub-battery B2. Accordingly, it is possible to drive the second load unit LO2 and execute a minimum operation or the like related to the autonomous driving.

It is assumed that an abnormality such as a short-circuit failure occurs in the second load unit LO2. In this case, the switching control unit 34 opens the first switching unit SW1 and the second switching unit SW2. In this state, a process of disconnecting a second load unit LO2 side in which an abnormality occurs is performed. Accordingly, the first load unit LO1 can be supplied with power from the DC/DC converter 10 or the main battery B1 without being affected by the abnormality in the second load unit LO2, and autonomous driving or the like can be executed. When the second load unit LO2 includes a plurality of loads and each of the loads includes a switch or a fuse, only a load in which an abnormality occurs may be cut off by using a function of the switch or the fuse. In this case, it is not necessary for the switching control unit 34 to open the first switching unit SW1 and the second switching unit SW2, and the switching control unit 34 may, for example, close the first switching unit SW1 and open the second switching unit SW2. Further, similar control may be performed when the first load unit LO1 is abnormal.

Further, it is assumed that an abnormality such as a short-circuit failure occurs in the sub-battery B2. In this case as well, the switching control unit 34 closes the first switching unit SW1 and opens the second switching unit SW2 as in a normal state. Accordingly, the switching control unit 34 supplies power to the first load unit LO1 and the second load unit LO2 by the normal DC/DC converter 10 or main battery B1, and disconnects the sub-battery B2.

In this way, according to the power supply redundancy system 2 according to the second embodiment, similarly to the first embodiment, it is possible to reduce the size and to achieve more appropriate protection, and it is possible to guarantee an operation of the sensors S1 and S2.

Next, a third embodiment according to the invention will be described. A power supply redundancy system according to the third embodiment is similar as that of the second embodiment, except for a part of a configuration and operation. Hereinafter, differences from the second embodiment will be described.

Figure 8:
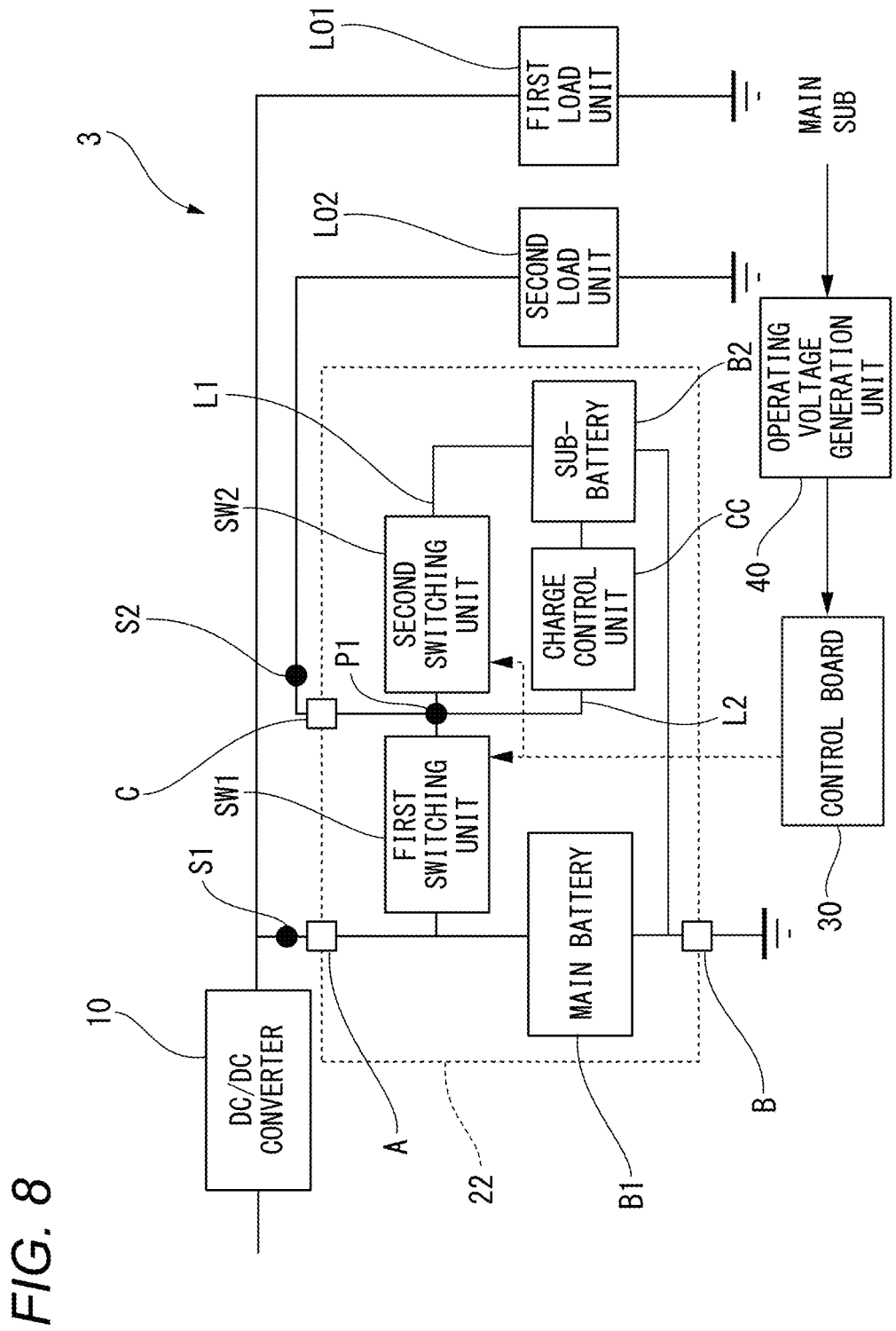
FIG. 8 is a block diagram showing a power supply redundancy system according to a third embodiment.

FIG. 8 is a block diagram showing the power supply redundancy system according to the third embodiment. A twin battery 22 according to the third embodiment includes a charge control unit CC in addition to the twin battery 21 according to the second embodiment.

The charge control unit CC controls charging of the sub-battery B2, and monitors whether the sub-battery B2 has a charge amount sufficient to drive the second load unit LO2, for example, and performs charging with a required amount when the charge amount is insufficient. The charge control unit CC is provided on a connection line L2 that is connected from the connection point P1 to the sub-battery B2 without passing through the second switching unit SW2.

When the twin battery 22 includes the charge control unit CC as in the third embodiment, a backflow prevention circuit is preferably provided between an input side of the charge control unit CC and the connection point P1 or between an output side of the charge control unit CC and the sub-battery B2. Although it is assumed that charging of the sub-battery B2 is completed by a function of the charge control unit CC, some functions may be performed by control from the control board 30 or a host electronic control unit (ECU).

Next, an operation of a power supply redundancy system 3 according to the third embodiment will be described with reference to FIG. 8. First, control over the first switching unit SW1 and the second switching unit SW2 in a normal state or an abnormal state is the same as that in the second embodiment.

Further, in the third embodiment, for example, the charge control unit CC monitors a charge amount of the sub-battery B2 in a normal state. When it is determined that the sub-battery B2 does not have a charge amount sufficient to cause the second load unit LO2 to function at the time of abnormality on the main battery B1 side, the charge control unit CC charges the sub-battery B2.

In this way, according to the power supply redundancy system 3 according to the third embodiment, similarly to the second embodiment, it is possible to reduce the size and to achieve more appropriate protection, and it is possible to guarantee an operation of the sensors S1 and S2.

Next, a fourth embodiment according to the invention will be described. A power supply redundancy system according to the fourth embodiment is similar as that of the second embodiment, except for a part of a configuration and operation. Hereinafter, differences from the second embodiment will be described.

Figure 9:
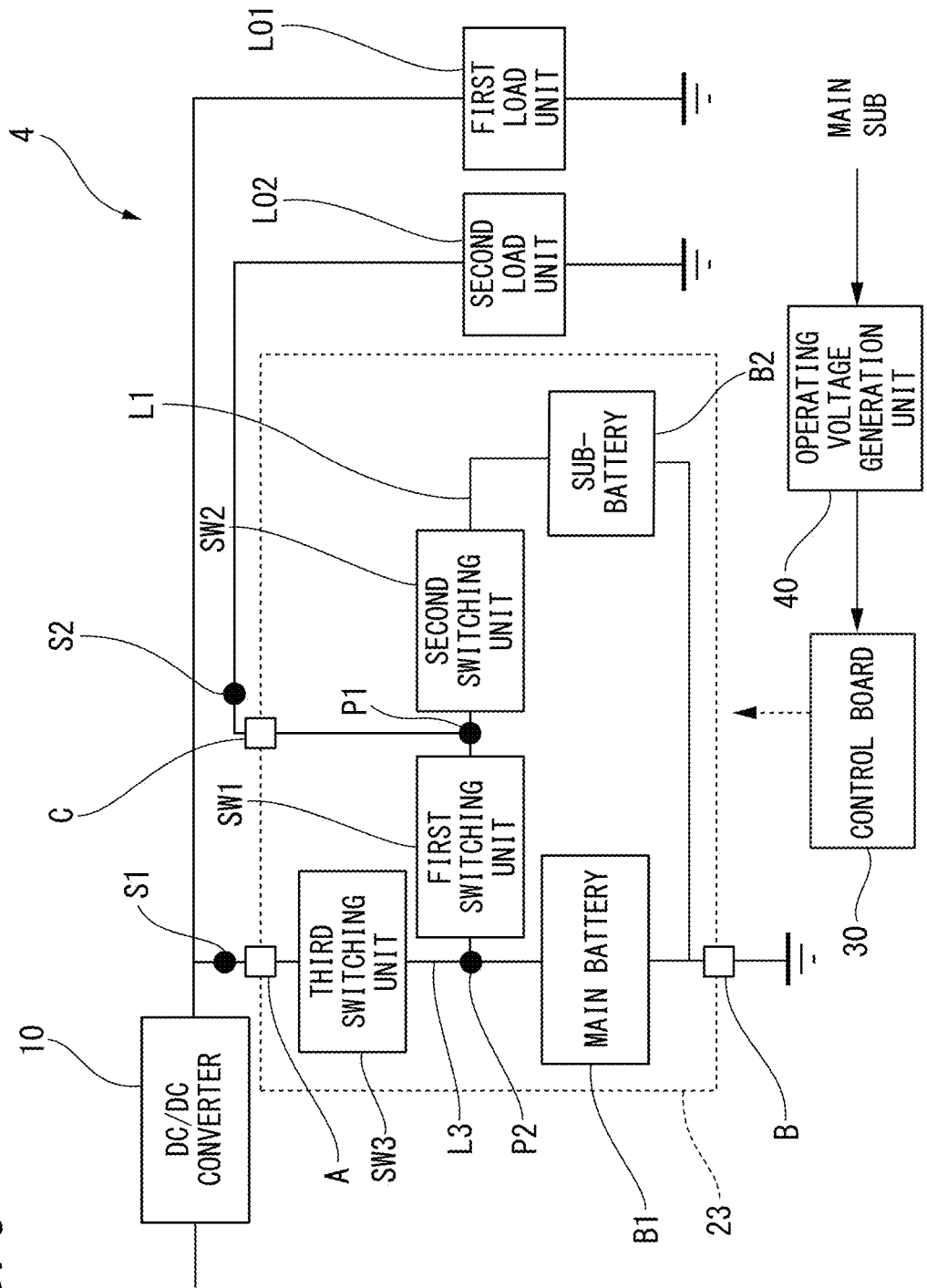
FIG. 9 is a block diagram showing a power supply redundancy system according to a fourth embodiment.

FIG. 9 is a block diagram showing a power supply redundancy system according to the fourth embodiment. The twin battery 23 according to the fourth embodiment includes a third switching unit SW3 in addition to the twin battery 21 according to the second embodiment.

The third switching unit SW3 is provided on a connection line L3 that connects the DC/DC converter 10 and the main battery B1. More specifically, the third switching unit SW3 is provided closer to a DC/DC converter 10 side than a connection point P2 with the connection line L1 branching from the connection line L3 toward the sub-battery B2. Like the first switching unit SW1 and the second switching unit SW2, the third switching unit SW3 can be changed between an open state and a closed state according to an instruction from the control board 30.

Further, in the fourth embodiment, the main battery B1 includes an abnormality detection unit that detects an abnormality in the main battery B1, and transmits the information to the control board 30 when the abnormality is detected. The sub-battery B2 also has a similar function. Therefore, the abnormality determination unit 33 of the control board 30 can determine four types of abnormalities, that is, an abnormality in the DC/DC converter 10, an abnormality in the main battery B1, an abnormality in the sub-battery B2, and an abnormality in the second load unit LO2.

The main battery B1 may not include the abnormality detection unit that detects an abnormality in the main battery B1. In this case, first, by detecting an abnormality based on a sensor signal from the first sensor S1, it can be determined that DC/DC converter 10 or main battery B1 is abnormal. Thereafter, when the switching control unit 34 opens the third switching unit SW3 and the sensor signal from the first sensor S1 returns to a normal state, it can be specified that the main battery B1 is abnormal. When the switching control unit 34 opens the third switching unit SW3 and the sensor signal from the first sensor S1 does not return to the normal state, it can be specified that the DC/DC converter 10 is abnormal. In this case as well, the abnormality determination unit 33 of the control board 30 can determine four types of abnormalities, that is, an abnormality in the DC/DC converter 10, an abnormality in the main battery B1, an abnormality in the sub-battery B2, and an abnormality in the second load unit LO2.

Next, an operation of a power supply redundancy system 4 according to the fourth embodiment will be described with reference to FIG. 9. First, it is assumed that the DC/DC converter 10, the main battery B1, the sub-battery B2, and the like are in a normal state in which there is no abnormality. In this case, the switching control unit 34 closes the first switching unit SW1 and the third switching unit SW3, and opens the second switching unit SW2. Accordingly, power can be supplied from the DC/DC converter 10 and the main battery B1 to the first load unit LO1 and the second load unit LO2. On the other hand, the sub-battery B2 is disconnected from the first load unit LO1 and the second load unit LO2, and power cannot be supplied from the sub-battery B2 to the first load unit LO1 and the second load unit LO2.

The switching control unit 34 may close the second switching unit SW2 to enable power to be supplied from the sub-battery B2 to the first load unit LO1 and the second load unit LO2. In this case, when there is a voltage difference between the main battery B1 and the sub-battery B2, a backflow prevention circuit is provided as in the second embodiment.

It is assumed that an abnormality such as a short-circuit failure occurs in the DC/DC converter 10. In this case, the switching control unit 34 closes the first switching unit SW1 and the second switching unit SW2, and opens the third switching unit SW3. In this state, since the third switching unit SW3 is open, power cannot be supplied to the first load unit LO1, but power is supplied to the second load unit LO2 by the main battery B1 and the sub-battery B2. Accordingly, it is possible to drive the second load unit LO2 and execute a minimum operation or the like related to the autonomous driving.

It is also assumed that an abnormality such as a short-circuit failure occurs in the main battery B1. In this case, the switching control unit 34 opens the first switching unit SW1 and the third switching unit SW3, and closes the second switching unit SW2. In this state, power is supplied from the DC/DC converter 10 to the first load unit LO1, and power is supplied from the sub-battery B2 to the second load unit LO2. Accordingly, autonomous driving by the first load unit LO1, a minimum operation by the second load unit LO2, and the like are executed.

It is assumed that an abnormality such as a short-circuit failure occurs in the second load unit LO2. In this case, the switching control unit 34 opens the first switching unit SW1 and the second switching unit SW2, and closes the third switching unit SW3. In this state, a process of disconnecting the second load unit LO2 in which an abnormality occurs is performed. Accordingly, the first load unit LO1 can be supplied with power from the DC/DC converter 10 or the main battery B1 without being affected by the abnormality in the second load unit LO2, and autonomous driving or the like can be executed. When the second load unit LO2 includes a plurality of loads and each of the loads includes a switch or a fuse, as in the second embodiment, only a load in which an abnormality occurs may be cut off by using a function of the switch or the fuse. In this case, it is not necessary for the switching control unit 34 to open the first switching unit SW1 and the second switching unit SW2, and the switching control unit 34 may, for example, close the first switching unit SW1 and open the second switching unit SW2.

Further, it is assumed that an abnormality such as a short-circuit failure occurs in the sub-battery B2. In this case as well, the switching control unit 34 closes the first switching unit SW1 and the third switching unit SW3, and opens the second switching unit SW2, as in a normal state. Accordingly, power is supplied to the first load unit LO1 and the second load unit LO2 by the normal DC/DC converter 10 or main battery B1, and the sub-battery B2 can be disconnected.

Here, when the main battery B1 does not include the abnormality detection unit that detects an abnormality in the main battery B1, it is necessary for the abnormality determination unit 33 to determine whether a sensor signal of the first sensor S1 returns to a normal value with the third switching unit SW3 in an open state. Therefore, the abnormality determination unit 33 determines that the DC/DC converter 10 or the main battery B1 is abnormal until determining whether the sensor signal of the first sensor S1 returns to the normal value. In this case, the switching control unit 34 opens the first switching unit SW1 and the third switching unit SW3, and closes the second switching unit SW2. That is, the switching control unit 34 is in the same switching state as when the main battery B1 is abnormal, and connects the sub-battery B2 and the second load unit LO2. Accordingly, the power supply redundancy system 4 first connects the sub-battery B2 and the second load unit LO2 and causes the second load unit LO2 to execute a minimum operation or the like until it is determined which of the DC/DC converter 10 and the main battery B1 is abnormal. The switching control unit 34 specifies which of the DC/DC converter 10 and the main battery B1 is abnormal based on whether the sensor signal of the first sensor S1 returns to the normal value, and after specifying, sets the first to third switching units SW1 to SW3 to the switching states described above.

In this way, according to the power supply redundancy system 4 according to the fourth embodiment, similarly to the second embodiment, it is possible to reduce the size and to achieve more appropriate protection, and it is possible to guarantee an operation of the sensors S1 and S2.

Further, according to the fourth embodiment, the sub-battery B2 and the second load unit LO2 are connected until it is specified which of the DC/DC converter 10 and the main battery B1 is abnormal. Therefore, first, by operating the second load unit LO2 using the sub-battery B2, for example, it is possible to buy a time until an abnormal portion is specified while performing minimum vehicle traveling or the like by the second load unit LO2, and thereafter, it is possible to take an appropriate measure.

Next, a fifth embodiment according to the invention will be described. A power supply redundancy system according to the fifth embodiment is similar as that of the fourth embodiment, except for a part of a configuration and operation. Hereinafter, differences from the fourth embodiment will be described.

Figure 10:
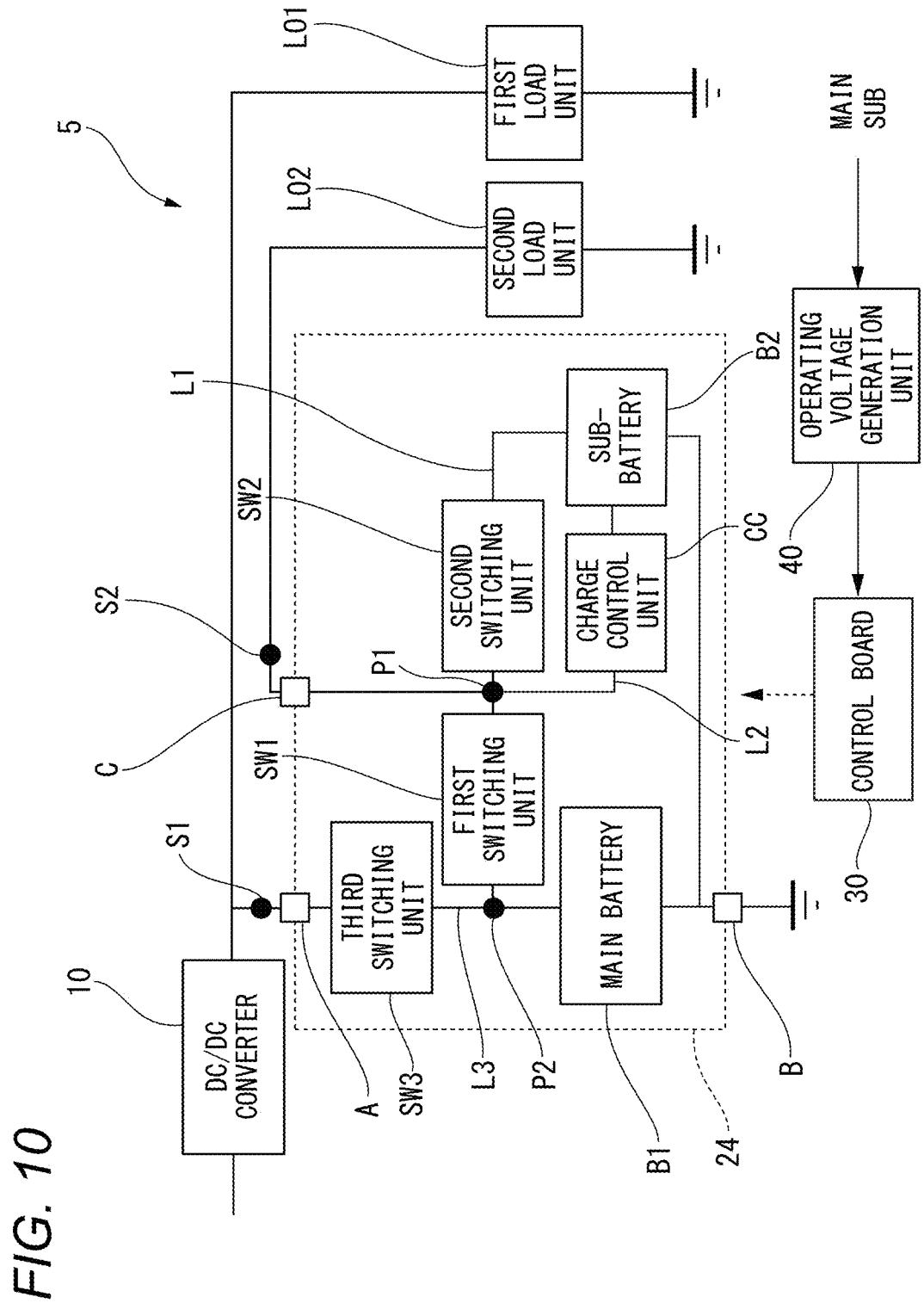
FIG. 10 is a block diagram showing a power supply redundancy system according to a fifth embodiment.

FIG. 10 is a block diagram showing the power supply redundancy system according to the fifth embodiment. A twin battery 24 according to the fifth embodiment includes the charge control unit CC in addition to the twin battery 23 according to the fourth embodiment. The charge control unit CC is the same as that described in the third embodiment, and is provided on the connection line L2 that connects the connection point P1 to the sub-battery B2 without passing through the second switching unit SW2.

Next, an operation of a power supply redundancy system 5 according to the fifth embodiment will be described with reference to FIG. 10. First, control over the first switching unit SW1, the second switching unit SW2, and the third switching unit SW3 in a normal state or an abnormal state is the same as that in the fourth embodiment.

Further, in the fifth embodiment, for example, the charge control unit CC monitors a charge amount of the sub-battery B2 in a normal state. When it is determined that the sub-battery B2 does not have a charge amount sufficient to cause the second load unit LO2 to function at the time of abnormality on the main battery B1 side, the charge control unit CC charges the sub-battery B2.

In this way, according to the power supply redundancy system 5 according to the fifth embodiment, similarly to the fourth embodiment, it is possible to reduce the size and to achieve more appropriate protection, and it is possible to guarantee an operation of the sensors S1 and S2. It is possible to take an appropriate measure after buying a time until the abnormal portion is specified.

Next, a sixth embodiment according to the invention will be described. A power supply redundancy system according to the sixth embodiment is similar as that of the first embodiment, except for a part of a configuration and operation. Hereinafter, differences from the first embodiment will be described.

Figure 11:
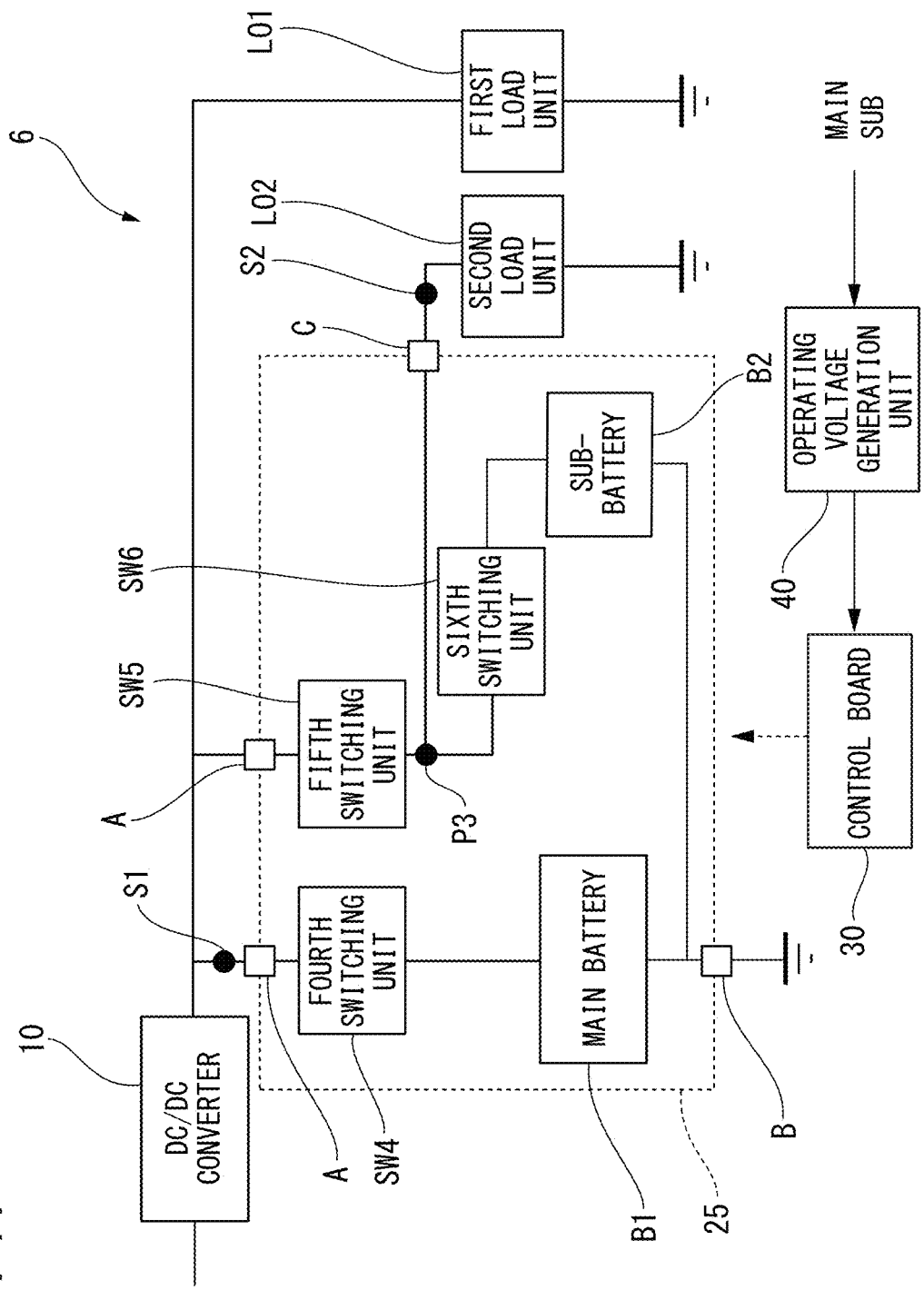
FIG. 11 is a block diagram showing a power supply redundancy system according to a sixth embodiment.

FIG. 11 is a block diagram showing the power supply redundancy system according to the sixth embodiment. Unlike the twin battery 20 according to the first embodiment, a twin battery 25 according to the sixth embodiment does not include the connection line L1 that connects the positive electrode side of the main battery B1 and the positive electrode side of the sub-battery B2 and the first to third switching units SW1 to SW3. On the other hand, the twin battery 25 according to the sixth embodiment includes fourth to sixth switching units SW4 to SW6. Like the first to third switching units SW1 to SW3 described above, the fourth to sixth switching units SW4 to SW6 are switched between an open state and a closed state under control of the control board 30.

In such a twin battery 25, the fourth switching unit SW4 is disposed between the terminal A and the positive electrode side of the main battery B1. The negative electrode side of the main battery B1 is connected to the terminal B. The fifth switching unit SW5 has one end connected to the terminal A and the other end connected to the sixth switching unit SW6. The other end of the sixth switching unit SW6 is connected to the positive electrode side of the sub-battery B2, and the negative electrode side of the sub-battery B2 is connected to the terminal B. A connection point P3 between the fifth switching unit SW5 and the sixth switching unit SW6 is connected to the terminal C. In the sixth embodiment, two terminals A are provided in order to provide a redundant configuration. However, the invention is not particularly limited thereto, and a configuration may be adopted in which the terminals A is combined into one and branched into a path leading to the fourth switching unit SW4 and a path leading to the fifth switching unit SW5 in the twin battery 25.

In the sixth embodiment, the main battery B1 includes an abnormality detection unit that detects an abnormality in the main battery B1, and transmits the information to the control board 30 when the abnormality is detected. The sub-battery B2 also has a similar function. Therefore, the abnormality determination unit 33 of the control board 30 can determine four types of abnormalities, that is, an abnormality in the DC/DC converter 10, an abnormality in the main battery B1, an abnormality in the sub-battery B2, and an abnormality in the second load unit LO2.

As in the fourth embodiment, the main battery B1 may not include the abnormality detection unit that detects an abnormality in the main battery B1. In this case, as described in the fourth embodiment, the abnormality determination unit 33 detects an abnormality in the DC/DC converter 10 or the main battery B1 based on a sensor signal from the first sensor S1. Thereafter, the switching control unit 34 opens the fourth switching unit SW4. When the sensor signal from the first sensor S1 returns to a normal state, the abnormality determination unit 33 specifies that the main battery B1 is abnormal. When the sensor signal from the first sensor S1 does not return to a normal state, the abnormality determination unit 33 specifies that the DC/DC converter 10 is abnormal.

Further, for the connection point P3, it is preferable to include a backflow prevention circuit for the same reason as described in the second embodiment.

Next, an operation of a power supply redundancy system 6 according to the sixth embodiment will be described with reference to FIG. 11. First, it is assumed that the DC/DC converter 10, the main battery B1, the sub-battery B2, and the like are in a normal state in which there is no abnormality. In this case, the switching control unit 34 closes the fourth switching unit SW4 and the fifth switching unit SW5, and opens the sixth switching unit SW6. Accordingly, power can be supplied from the DC/DC converter 10 and the main battery B1 to the first load unit LO1 and the second load unit LO2. On the other hand, the sub-battery B2 is disconnected from the first load unit LO1 and the second load unit LO2, and power cannot be supplied from the sub-battery B2 to the first load unit LO1 and the second load unit LO2.

It is assumed that an abnormality such as a short-circuit failure occurs in the DC/DC converter 10. In this case, the switching control unit 34 opens the fourth switching unit SW4 and the fifth switching unit SW5, and closes the sixth switching unit SW6. In this state, since only the sixth switching unit SW6 is closed, power cannot be supplied to the first load unit LO1, but power is supplied to the second load unit LO2 by the sub-battery B2. Accordingly, it is possible to drive the second load unit LO2 and execute a minimum operation or the like related to the autonomous driving.

It is also assumed that an abnormality such as a short-circuit failure occurs in the main battery B1. In this case, the switching control unit 34 opens the fourth switching unit SW4, and closes the fifth switching unit SW5 and the sixth switching unit SW6. In this state, power is supplied from the DC/DC converter 10 and the sub-battery B2 to the first load unit LO1 and the second load unit LO2. Accordingly, autonomous driving by the first load unit LO1, a minimum operation by the second load unit LO2, and the like are executed.

It is assumed that an abnormality such as a short-circuit failure occurs in the second load unit LO2. In this case, the switching control unit 34 opens the fifth switching unit SW5 and the sixth switching unit SW6, and closes the fourth switching unit SW4. In this state, a process of disconnecting the second load unit LO2 in which an abnormality occurs is performed. Accordingly, the first load unit LO1 can be supplied with power from the DC/DC converter 10 or the main battery B1 without being affected by the abnormality in the second load unit LO2, and autonomous driving or the like can be executed. When the second load unit LO2 includes a plurality of loads and each of the loads includes a switch or a fuse, only a load in which an abnormality occurs may be cut off by using a function of the switch or the fuse. In this case, the switching control unit 34 may set the fourth to sixth switching units SW4 to SW6 to the same state as in the normal state, for example.

Further, it is assumed that an abnormality such as a short-circuit failure occurs in the sub-battery B2. In this case as well, the switching control unit 34 closes the fourth switching unit SW4 and the fifth switching unit SW5, and opens the sixth switching unit SW6, as in the normal state. Accordingly, power is supplied to the first load unit LO1 and the second load unit LO2 by the normal DC/DC converter 10 or main battery B1, and the sub-battery B2 can be disconnected.

When the main battery B1 does not include the abnormality detection unit that detects an abnormality in the main battery B1 as in the fourth embodiment, it is necessary for the abnormality determination unit 33 to determine whether a sensor signal of the first sensor S1 returns to a normal value with the fourth switching unit SW4 in an open state. Therefore, the abnormality determination unit 33 determines that the DC/DC converter 10 or the main battery B1 is abnormal until determining whether the sensor signal of the first sensor S1 returns to the normal value. In this case, the switching control unit 34 opens the fourth switching unit SW4 and the fifth switching unit SW5 and closes the sixth switching unit SW6. That is, the switching control unit 34 is in the same switching state as when the DC/DC converter 10 is abnormal, and connects the sub-battery B2 and the second load unit LO2. Accordingly, the power supply redundancy system 6 first connects the sub-battery B2 and the second load unit LO2 and causes the second load unit LO2 to execute a minimum operation or the like until it is determined which of the DC/DC converter 10 and the main battery B1 is abnormal. The switching control unit 34 specifies which of the DC/DC converter 10 and the main battery B1 is abnormal based on whether the sensor signal of the first sensor S1 returns to the normal value, and after specifying, sets the fourth to sixth switching units SW4 to SW6 to the switching states described above.

In this way, according to the power supply redundancy system 6 according to the sixth embodiment, similarly to the first embodiment, it is possible to reduce the size and to achieve more appropriate protection, and it is possible to guarantee an operation of the sensors S1 and S2.

Further, according to the sixth embodiment, similarly to the fourth embodiment, it is possible to take an appropriate measure after buying a time until an abnormal portion is specified.

Next, a seventh embodiment according to the invention will be described. A power supply redundancy system according to the seventh embodiment is similar as that of the sixth embodiment, except for a part of a configuration and operation. Hereinafter, differences from the sixth embodiment will be described.

Figure 12:
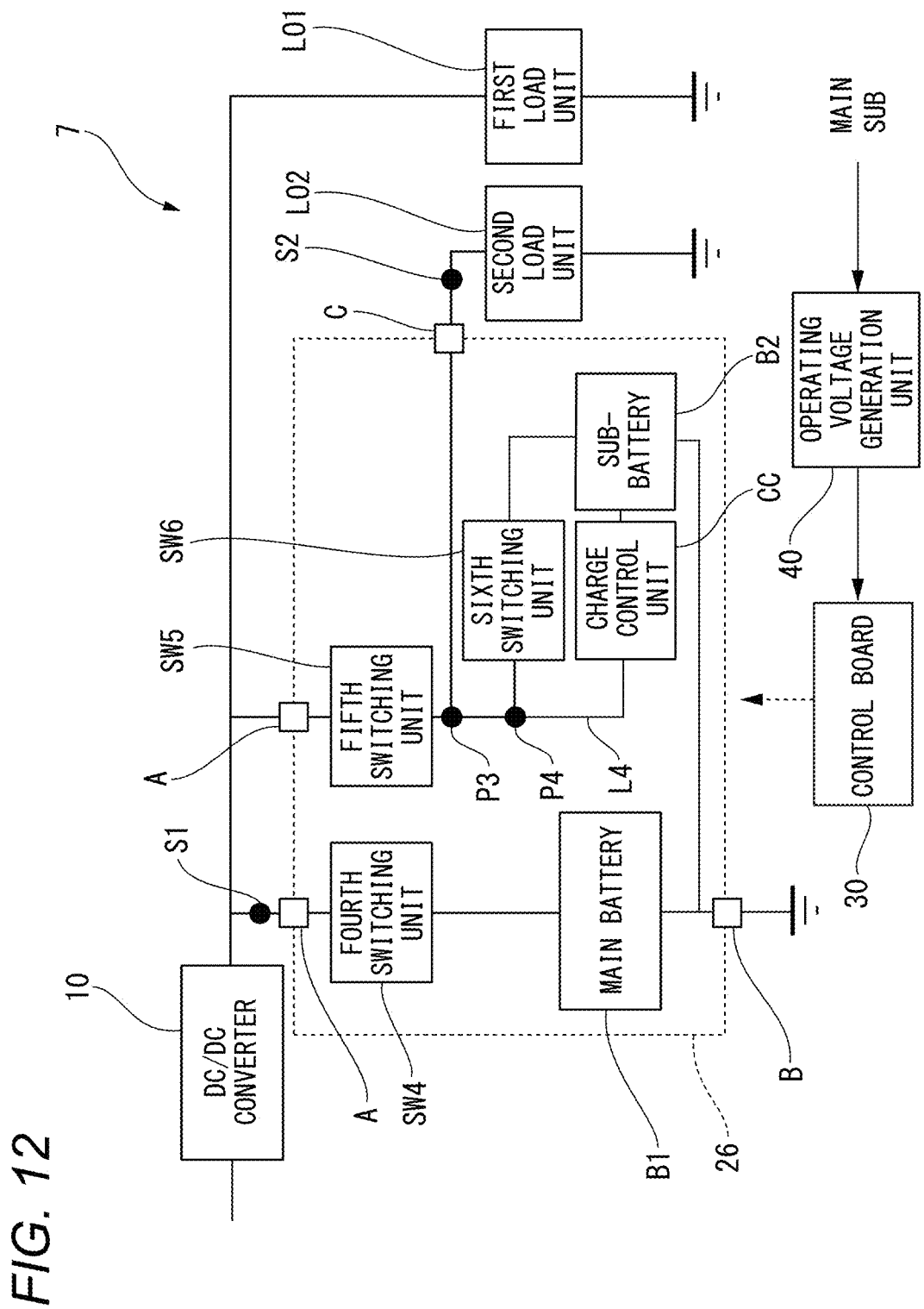
FIG. 12 is a block diagram showing a power supply redundancy system according to a seventh embodiment.

FIG. 12 is a block diagram showing the power supply redundancy system according to the seventh embodiment. A twin battery 26 according to the seventh embodiment includes the charge control unit CC in addition to the twin battery 25 according to the sixth embodiment. The charge control unit CC is the same as that described in the third embodiment, and is provided on a connection line L4 that connects the connection point P3 to the sub-battery B2 without passing through the sixth switching unit SW6.

Next, an operation of a power supply redundancy system 7 according to the seventh embodiment will be described with reference to FIG. 12. First, control over the switching units SW4 to SW6 in a normal state or an abnormal state is the same as that in the sixth embodiment.

Further, in the seventh embodiment, for example, the charge control unit CC monitors a charge amount of the sub-battery B2 in a normal state. When it is determined that the sub-battery B2 does not have a charge amount sufficient to cause the second load unit LO2 to function at the time of abnormality on the main battery B1 side, the charge control unit CC charges the sub-battery B2.

In this way, according to the power supply redundancy system 7 according to the seventh embodiment, similarly to the sixth embodiment, it is possible to reduce the size and to achieve more appropriate protection, and it is possible to guarantee an operation of the sensors S1 and S2. It is possible to take an appropriate measure after buying a time until the abnormal portion is specified.

Next, an eighth embodiment according to the invention will be described. A power supply redundancy system according to the eighth embodiment is similar as that of the sixth embodiment, except for a part of a configuration and operation. Hereinafter, differences from the sixth embodiment will be described.

Figure 13:
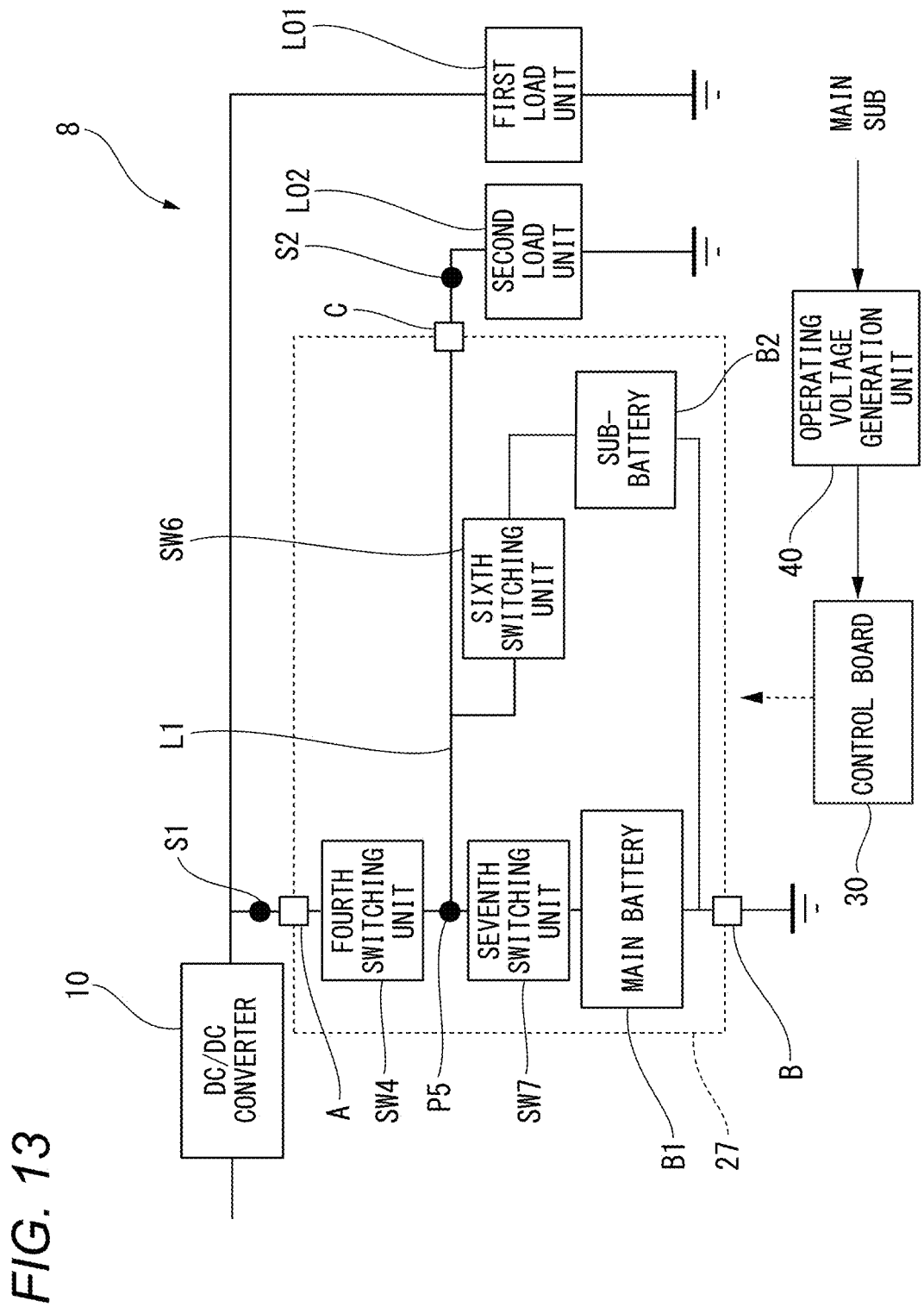
FIG. 13 is a block diagram showing a power supply redundancy system according to an eighth embodiment.

FIG. 13 is a block diagram showing the power supply redundancy system according to the eighth embodiment. Unlike the twin battery 25 according to the sixth embodiment, a twin battery 27 according to the eighth embodiment includes the connection line L1 that connects the positive electrode side of the main battery B1 and the positive electrode side of the sub-battery B2. The twin battery 27 according to the eighth embodiment includes a seventh switching unit SW7 instead of the fifth switching unit SW5 of the twin battery 25 according to the sixth embodiment. Like the first to sixth switching units SW1 to SW6, the seventh switching unit SW7 is switched between an open state and a closed state under control of the control board 30.

Such a twin battery 27 does not include the fifth switching unit SW5, and the terminal A is connected only to the fourth switching unit SW4. The seventh switching unit SW7 is disposed between the fourth switching unit SW4 and the main battery B1. A connection point P5 between the fourth switching unit SW4 and the seventh switching unit SW7 is connected from the sixth switching unit SW6 to the terminal B via the sub-battery B2. The connection point P5 is also connected to the terminal C.

Next, an operation of a power supply redundancy system 8 according to the eighth embodiment will be described with reference to FIG. 13. First, it is assumed that the DC/DC converter 10, the main battery B1, the sub-battery B2, and the like are in a normal state in which there is no abnormality. In this case, the switching control unit 34 closes the fourth switching unit SW4 and the seventh switching unit SW7, and opens the sixth switching unit SW6. Accordingly, power can be supplied from the DC/DC converter 10 and the main battery B1 to the first load unit LO1 and the second load unit LO2. On the other hand, the sub-battery B2 is disconnected from the first load unit LO1 and the second load unit LO2, and power cannot be supplied from the sub-battery B2 to the first load unit LO1 and the second load unit LO2.

It is assumed that an abnormality such as a short-circuit failure occurs in the DC/DC converter 10. In this case, the switching control unit 34 opens the fourth switching unit SW4 and the seventh switching unit SW7, and closes the sixth switching unit SW6. In this state, since only the sixth switching unit SW6 is closed, power cannot be supplied to the first load unit LO1, but power is supplied to the second load unit LO2 by the sub-battery B2. Accordingly, it is possible to drive the second load unit LO2 and execute a minimum operation or the like related to the autonomous driving.

It is also assumed that an abnormality such as a short-circuit failure occurs in the main battery B1. In this case, the switching control unit 34 opens the seventh switching unit SW7, and closes the fourth switching unit SW4 and the sixth switching unit SW6. In this state, power is supplied from the DC/DC converter 10 and the sub-battery B2 to the first load unit LO1 and the second load unit LO2. Accordingly, autonomous driving by the first load unit LO1, a minimum operation by the second load unit LO2, and the like are executed.

It is assumed that an abnormality such as a short-circuit failure occurs in the second load unit LO2. In this case, the switching control unit 34 opens all of the fourth switching unit SW4, the sixth switching unit SW6, and the seventh switching unit SW7. In this state, a process of disconnecting the second load unit LO2 in which an abnormality occurs is performed. Accordingly, the first load unit LO1 can be supplied with power from the DC/DC converter 10 without being affected by the abnormality in the second load unit LO2, and autonomous driving or the like can be executed. When the second load unit LO2 includes a plurality of loads and each of the loads includes a switch or a fuse, as in the above-described embodiment, only a load in which an abnormality occurs may be cut off by using a function of the switch or the fuse. In this case, the switching control unit 34 may set the fourth switching unit SW4, the sixth switching unit SW6, and the seventh switching unit SW7 to the same state as in the normal state, for example.

Further, it is assumed that an abnormality such as a short-circuit failure occurs in the sub-battery B2. In this case as well, the switching control unit 34 closes the fourth switching unit SW4 and the seventh switching unit SW7, and opens the sixth switching unit SW6, as in the normal state. Accordingly, power is supplied to the first load unit LO1 and the second load unit LO2 by the normal DC/DC converter 10 or main battery B1, and the sub-battery B2 can be disconnected.

When the main battery B1 does not include the abnormality detection unit that detects an abnormality in the main battery B1 as in the fourth embodiment, it is necessary for the abnormality determination unit 33 to determine whether a sensor signal of the first sensor S1 returns to a normal value with the fourth switching unit SW4 in an open state. Therefore, the abnormality determination unit 33 determines that the DC/DC converter 10 or the main battery B1 is abnormal until determining whether the sensor signal of the first sensor S1 returns to the normal value. In this case, the switching control unit 34 opens the fourth switching unit SW4 and the seventh switching unit SW7, and closes the sixth switching unit SW6. That is, the switching control unit 34 is in the same switching state as when the DC/DC converter 10 is abnormal, and connects the sub-battery B2 and the second load unit LO2. Accordingly, the power supply redundancy system 8 first connects the sub-battery B2 and the second load unit LO2 and causes the second load unit LO2 to execute a minimum operation or the like until it is determined which of the DC/DC converter 10 and the main battery B1 is abnormal. The switching control unit 34 specifies an abnormal location based on whether the sensor signal of the first sensor S1 returns to the normal value, and after specifying the abnormal location, sets the fourth switching unit SW4, the sixth switching unit SW6, and the seventh switching unit SW7 to the switching states described above.

In this way, according to the power supply redundancy system 8 according to the eighth embodiment, similarly to the sixth embodiment, it is possible to reduce the size and to achieve more appropriate protection, and it is possible to guarantee an operation of the sensors S1 and S2. It is possible to take an appropriate measure after buying a time until the abnormal portion is specified.

Next, a ninth embodiment according to the invention will be described. A power supply redundancy system according to the ninth embodiment is similar as that of the eighth embodiment, except for a part of a configuration and operation. Hereinafter, differences from the eighth embodiment will be described.

Figure 14:
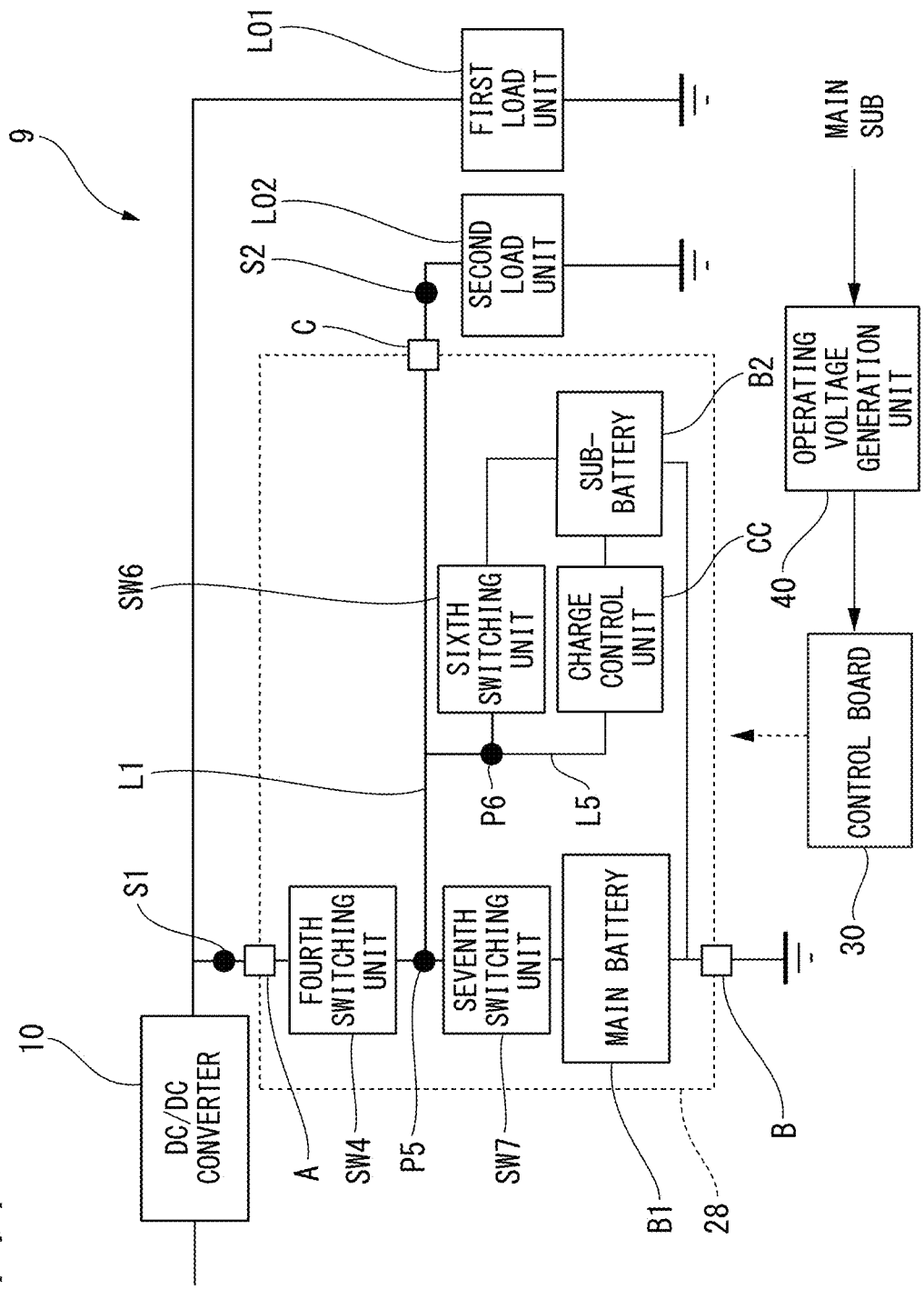
FIG. 14 is a block diagram showing a power supply redundancy system according to a ninth embodiment.

FIG. 14 is a block diagram showing the power supply redundancy system according to the ninth embodiment. A twin battery 28 according to the ninth embodiment includes the charge control unit CC in addition to the twin battery 27 according to the eighth embodiment. The charge control unit CC is the same as that described in the third embodiment, and is provided on a connection line L5 that connects a connection point P6 located between the connection point P5 and the sixth switching unit SW6 to the sub-battery B2 without passing through the sixth switching unit SW6.

Next, an operation of a power supply redundancy system 9 according to the ninth embodiment will be described with reference to FIG. 14. First, control over the switching units SW4, SW6, and SW7 in a normal state or an abnormal state is the same as that in the eighth embodiment.

Further, in the ninth embodiment, for example, the charge control unit CC monitors a charge amount of the sub-battery B2 in a normal state. When it is determined that the sub-battery B2 does not have a charge amount sufficient to cause the second load unit LO2 to function at the time of abnormality on the main battery B1 side, the charge control unit CC charges the sub-battery B2.

In this way, according to the power supply redundancy system 9 according to the ninth embodiment, similarly to the eighth embodiment, it is possible to reduce the size and to achieve more appropriate protection, and it is possible to guarantee an operation of the sensors S1 and S2. It is possible to take an appropriate measure after buying a time until the abnormal portion is specified.

Next, a tenth embodiment according to the invention will be described. A power supply redundancy system according to the tenth embodiment is similar as that of the sixth embodiment, except for a part of a configuration and operation. Hereinafter, differences from the sixth embodiment will be described.

Figure 15:
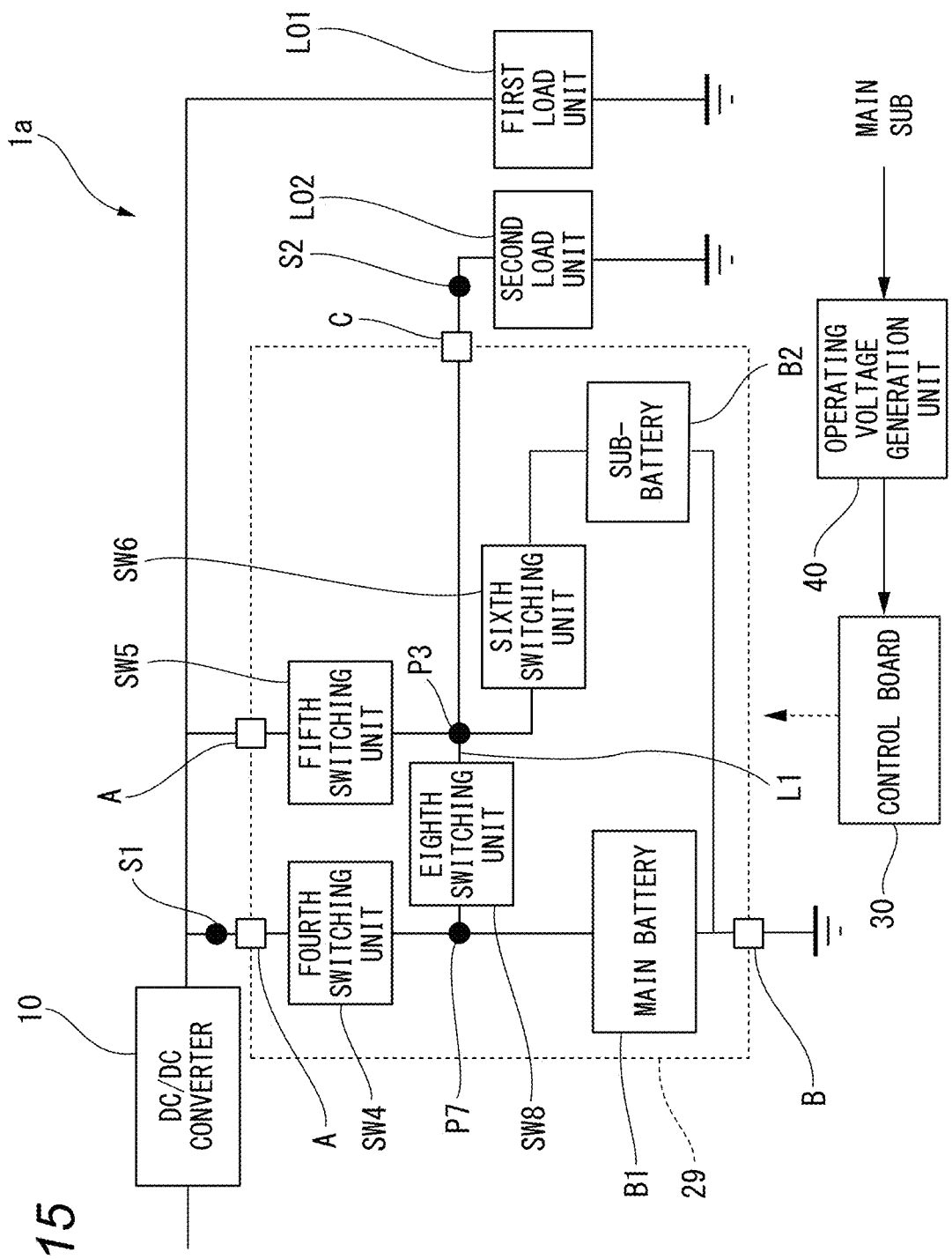
FIG. 15 is a block diagram showing a power supply redundancy system according to a tenth embodiment.

FIG. 15 is a block diagram showing the power supply redundancy system according to the tenth embodiment. Unlike the twin battery 25 according to the sixth embodiment, a twin battery 29 according to the tenth embodiment includes the connection line L1 that connects the positive electrode side of the main battery B1 and the positive electrode side of the sub-battery B2, and an eighth switching unit SW8 provided on the connection line L1. Like the first to seventh switching units SW1 to SW7, the eighth switching unit SW8 is switched between an open state and a closed state under control of the control board 30. The eighth switching unit SW8 is provided between a connection point P7 between the fourth switching unit SW4 and the main battery B1 and the connection point P3 between the fifth switching unit SW5 and the sixth switching unit SW6.

Next, an operation of a power supply redundancy system 1a according to the tenth embodiment will be described with reference to FIG. 15. First, it is assumed that the DC/DC converter 10, the main battery B1, the sub-battery B2, and the like are in a normal state in which there is no abnormality. In this case, the switching control unit 34 closes the fourth switching unit SW4 and the fifth switching unit SW5, and opens the sixth switching unit SW6 and the eighth switching unit SW8. Accordingly, power can be supplied from the DC/DC converter 10 and the main battery B1 to the first load unit LO1 and the second load unit LO2. On the other hand, the sub-battery B2 is disconnected from the first load unit LO1 and the second load unit LO2, and power cannot be supplied from the sub-battery B2 to the first load unit LO1 and the second load unit LO2.

It is assumed that an abnormality such as a short-circuit failure occurs in the DC/DC converter 10. In this case, the switching control unit 34 opens the fourth switching unit SW4, the fifth switching unit SW5, and the eighth switching unit SW8, and closes the sixth switching unit SW6. In this state, since only the sixth switching unit SW6 is closed, power cannot be supplied to the first load unit LO1, but power is supplied to the second load unit LO2 by the sub-battery B2. Accordingly, it is possible to drive the second load unit LO2 and execute a minimum operation or the like related to the autonomous driving.

Further, in an abnormal state of the DC/DC converter 10, the switching control unit 34 may open the fourth switching unit SW4 and the fifth switching unit SW5, and close the sixth switching unit SW6 and the eighth switching unit SW8. In this state, since the sixth switching unit SW6 and the eighth switching unit SW8 are in the closed state, power can be supplied to the second load unit LO2 by the main battery B1 and the sub-battery B2.

It is also assumed that an abnormality such as a short-circuit failure occurs in the main battery B1. In this case, the switching control unit 34 opens the fourth switching unit SW4 and the eighth switching unit SW8, and closes the fifth switching unit SW5 and the sixth switching unit SW6. In this state, power is supplied from the DC/DC converter 10 and the sub-battery B2 to the first load unit LO1 and the second load unit LO2. Accordingly, autonomous driving by the first load unit LO1, a minimum operation by the second load unit LO2, and the like are executed.

It is assumed that an abnormality such as a short-circuit failure occurs in the second load unit LO2. In this case, the switching control unit 34 closes the fourth switching unit SW4, and opens the fifth switching unit SW5, the sixth switching unit SW6, and the eighth switching unit SW8. In this state, a process of disconnecting the second load unit LO2 in which an abnormality occurs is performed. Accordingly, the first load unit LO1 can be supplied with power from the DC/DC converter 10 or the main battery B1 without being affected by the abnormality in the second load unit LO2, and autonomous driving or the like can be executed. When the second load unit LO2 includes a plurality of loads and each of the loads includes a switch or a fuse, as in the sixth embodiment, only a load in which an abnormality occurs may be cut off by using a function of the switch or the fuse. In this case, the switching control unit 34 may set the fourth to sixth switching units SW4 to SW6 and the eighth switching unit SW8 to the same state as in the normal state, for example.

Further, it is assumed that an abnormality such as a short-circuit failure occurs in the sub-battery B2. In this case as well, the switching control unit 34 closes the fourth switching unit SW4 and the fifth switching unit SW5, and opens the sixth switching unit SW6 and the eighth switching unit SW8, as in the normal state. Accordingly, power is supplied to the first load unit LO1 and the second load unit LO2 by the normal DC/DC converter 10 or main battery B1, and the sub-battery B2 can be disconnected.

When the main battery B1 does not include an abnormality detection unit that detects an abnormality in the main battery B1 as in the sixth embodiment, the switching control unit 34 opens at least the fourth switching unit SW4 and disconnects the DC/DC converter 10 and the main battery B1. It is necessary for the abnormality determination unit 33 to determine whether the sensor signal of the first sensor S1 returns to a normal value after the disconnection. Therefore, the abnormality determination unit 33 determines that the DC/DC converter 10 or the main battery B1 is abnormal until determining whether the sensor signal of the first sensor S1 returns to the normal value. In this case, the switching control unit 34 opens the fourth switching unit SW4, the fifth switching unit SW5, and the eighth switching unit SW8, and closes the sixth switching unit SW6. That is, the switching control unit 34 connects the sub-battery B2 and the second load unit LO2 in the same state as one of the two switching states when the DC/DC converter 10 is abnormal. Accordingly, the power supply redundancy system 1a first connects the sub-battery B2 and the second load unit LO2 and causes the second load unit LO2 to execute a minimum operation or the like until it is determined which of the DC/DC converter 10 and the main battery B1 is abnormal. The switching control unit 34 specifies an abnormal location based on whether the sensor signal of the first sensor S1 returns to the normal value, and after specifying the abnormal location, sets the fourth to sixth switching units SW4 to SW6 and the eighth switching unit SW8 to the switching states described above.

In this way, according to the power supply redundancy system 1a according to the tenth embodiment, similarly to the sixth embodiment, it is possible to reduce the size and to achieve more appropriate protection, and it is possible to guarantee an operation of the sensors S1 and S2. It is possible to take an appropriate measure after buying a time until the abnormal portion is specified.

Next, an eleventh embodiment according to the invention will be described. A power supply redundancy system according to the eleventh embodiment is similar as that of the tenth embodiment, except for a part of a configuration and operation. Hereinafter, differences from the tenth embodiment will be described.

Figure 16:
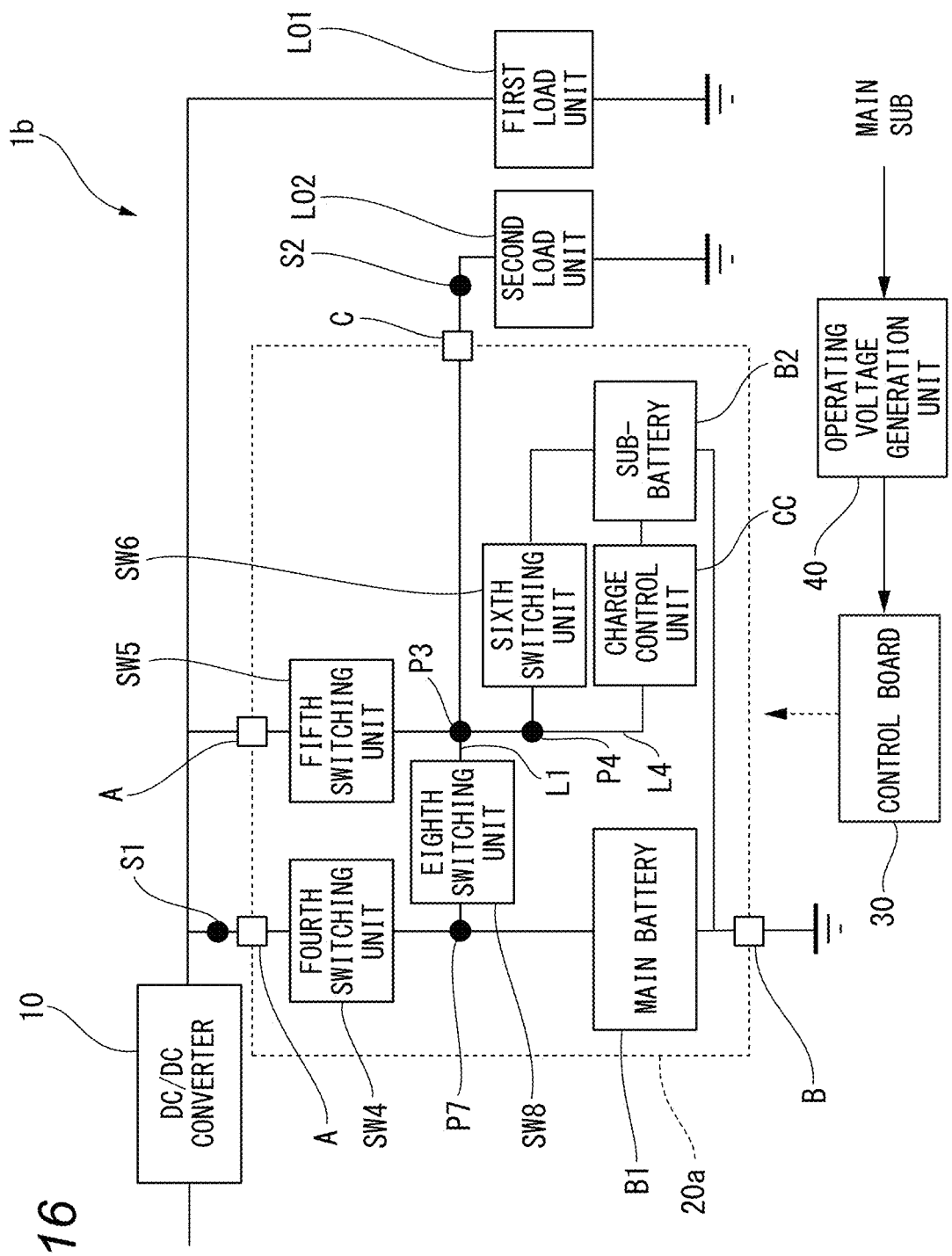
FIG. 16 is a block diagram showing a power supply redundancy system according to an eleventh embodiment.

FIG. 16 is a block diagram showing the power supply redundancy system according to the eleventh embodiment. A twin battery 20a according to the eleventh embodiment includes the charge control unit CC in addition to the twin battery 29 according to the tenth embodiment. The charge control unit CC is the same as that described in the third embodiment, and is provided on the connection line L4 that connects the connection point P4 located between the connection point P3 and the sixth switching unit SW6 to the sub-battery B2 without passing through the sixth switching unit SW6.

Next, an operation of a power supply redundancy system 1b according to the eleventh embodiment will be described with reference to FIG. 16. First, control over the switching units SW4 to SW6 and SW8 in a normal state or an abnormal state is the same as that in the tenth embodiment.

Further, in the eleventh embodiment, for example, the charge control unit CC monitors a charge amount of the sub-battery B2 in a normal state. When it is determined that the sub-battery B2 does not have a charge amount sufficient to cause the second load unit LO2 to function at the time of abnormality on the main battery B1 side, the charge control unit CC charges the sub-battery B2.

In this way, according to the power supply redundancy system 1b according to the eleventh embodiment, similarly to the tenth embodiment, it is possible to reduce the size and to achieve more appropriate protection, and it is possible to guarantee an operation of the sensors S1 and S2. It is possible to take an appropriate measure after buying a time until the abnormal portion is specified.

Next, a twelfth embodiment according to the invention will be described. A power supply redundancy system according to the twelfth embodiment is similar as that of the sixth embodiment, except for a part of a configuration and operation. Hereinafter, differences from the sixth embodiment will be described.

Figure 17:
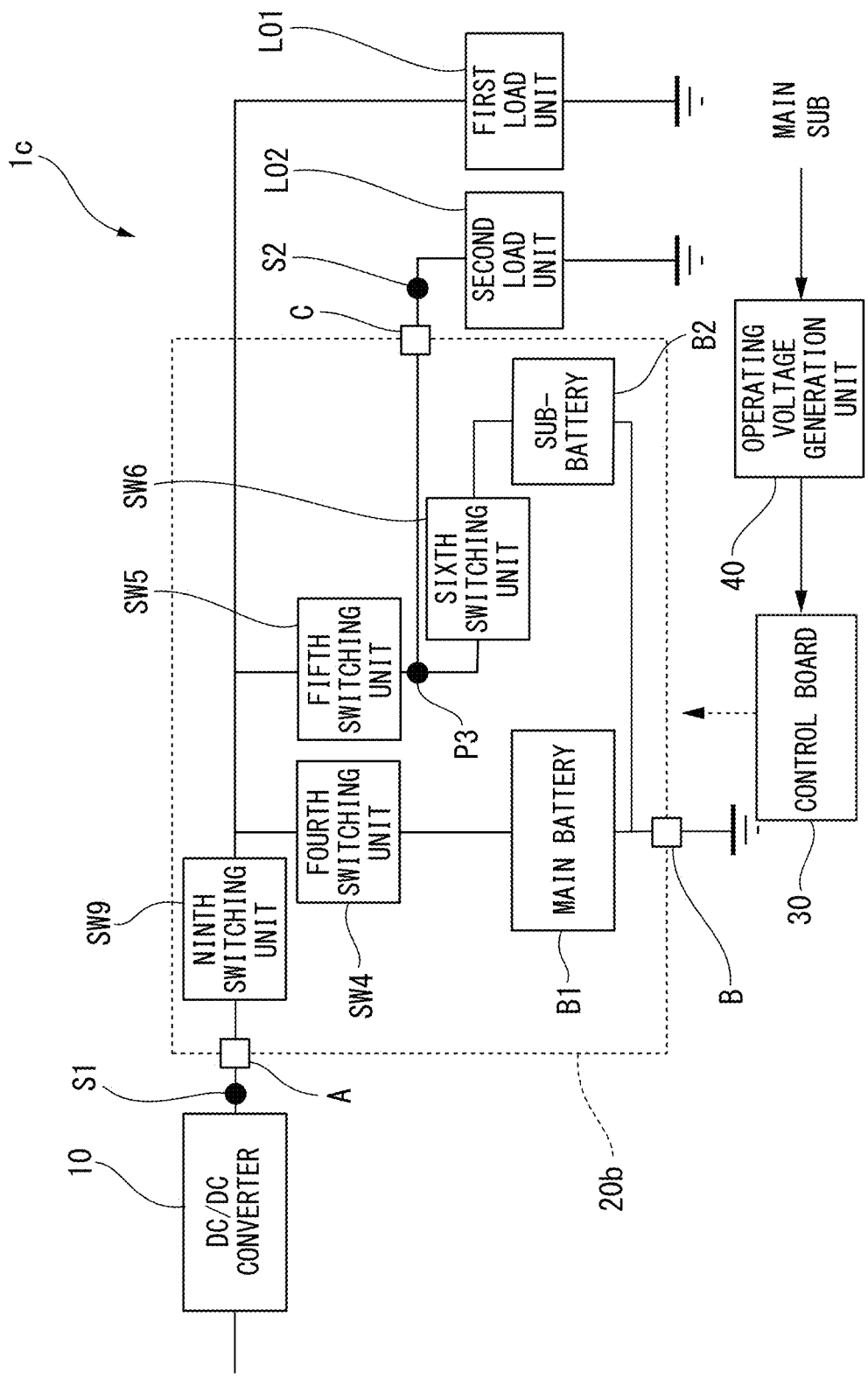
FIG. 17 is a block diagram showing a power supply redundancy system according to a twelfth embodiment.

FIG. 17 is a block diagram showing the power supply redundancy system according to the twelfth embodiment. A twin battery 20b according to the twelfth embodiment includes a ninth switching unit SW9 in addition to the twin battery 25 according to the sixth embodiment. Like the first to eighth switching units SW1 to SW8, the ninth switching unit SW9 is switched between an open state and a closed state under control of the control board 30. The ninth switching unit SW9 is provided closer to the DC/DC converter 10 side than the fourth switching unit SW4 and the fifth switching unit SW5. Therefore, the terminal A of the twin battery 20b is connected to one end of the ninth switching unit SW9, and the fourth switching unit SW4 and the fifth switching unit SW5 are connected in parallel to the other end of the ninth switching unit SW9.

Next, an operation of a power supply redundancy system 1c according to the twelfth embodiment will be described with reference to FIG. 17. First, it is assumed that the DC/DC converter 10, the main battery B1, the sub-battery B2, and the like are in a normal state in which there is no abnormality. In this case, the switching control unit 34 closes the fourth switching unit SW4, the fifth switching unit SW5, and the ninth switching unit SW9, and opens the sixth switching unit SW6. Accordingly, power can be supplied from the DC/DC converter 10 and the main battery B1 to the first load unit LO1 and the second load unit LO2. On the other hand, the sub-battery B2 is disconnected from the first load unit LO1 and the second load unit LO2, and power cannot be supplied from the sub-battery B2 to the first load unit LO1 and the second load unit LO2.

It is assumed that an abnormality such as a short-circuit failure occurs in the DC/DC converter 10. In this case, the switching control unit 34 opens the fourth switching unit SW4, the fifth switching unit SW5, and the ninth switching unit SW9, and closes the sixth switching unit SW6. In this state, since only the sixth switching unit SW6 is closed, power cannot be supplied to the first load unit LO1, but power is supplied to the second load unit LO2 by the sub-battery B2. Accordingly, it is possible to drive the second load unit LO2 and execute a minimum operation or the like related to the autonomous driving.

Further, in an abnormal state of the DC/DC converter 10, the switching control unit 34 may close the fourth switching unit SW4 and the fifth switching unit SW5, and open the sixth switching unit SW6 and the ninth switching unit SW9. In this state, since the fourth switching unit SW4 and the fifth switching unit SW5 are in the closed state, power can be supplied to the first load unit LO1 and the second load unit LO2 by the main battery B1 and the sub-battery B2.

When an abnormality such as a short-circuit failure occurs in the main battery B1, the switching control unit 34 opens the fourth switching unit SW4, and closes the fifth switching unit SW5, the sixth switching unit SW6, and the ninth switching unit SW9. In this state, power is supplied from the DC/DC converter 10 and the sub-battery B2 to the first load unit LO1 and the second load unit LO2. Accordingly, autonomous driving by the first load unit LO1, a minimum operation by the second load unit LO2, and the like are executed.

It is assumed that an abnormality such as a short-circuit failure occurs in the second load unit LO2. In this case, the switching control unit 34 closes the fourth switching unit SW4 and the ninth switching unit SW9, and opens the fifth switching unit SW5 and the sixth switching unit SW6. In this state, a process of disconnecting the second load unit LO2 in which an abnormality occurs is performed. Accordingly, the first load unit LO1 can be supplied with power from the DC/DC converter 10 or the main battery B1 without being affected by the abnormality in the second load unit LO2, and autonomous driving or the like can be executed. When the second load unit LO2 includes a plurality of loads and each of the loads includes a switch or a fuse, only a load in which an abnormality occurs may be cut off by using a function of the switch or the fuse. In this case, the switching control unit 34 may set the fourth to sixth switching units SW4 to SW6 and the ninth switching unit SW9 to the same state as in the normal state, for example.

Further, it is assumed that an abnormality such as a short-circuit failure occurs in the sub-battery B2. In this case as well, the switching control unit 34 closes the fourth switching unit SW4, the fifth switching unit SW5, and the ninth switching unit SW9, and opens the sixth switching unit SW6, as in a normal state. Accordingly, power is supplied to the first load unit LO1 and the second load unit LO2 by the normal DC/DC converter 10 or main battery B1, and the sub-battery B2 can be disconnected.

When the main battery B1 does not include the abnormality detection unit that detects an abnormality in the main battery B1 as in the fourth embodiment, it is necessary for the abnormality determination unit 33 to determine whether a sensor signal of the first sensor S1 returns to a normal value with the fourth switching unit SW4 and the ninth switching unit SW9 in an open state. Therefore, the abnormality determination unit 33 determines that the DC/DC converter 10 or the main battery B1 is abnormal until determining whether the sensor signal of the first sensor S1 returns to the normal value. In this case, the switching control unit 34 opens the fourth switching unit SW4, the fifth switching unit SW5, and the ninth switching unit SW9, and closes the sixth switching unit SW6. That is, the switching control unit 34 connects the sub-battery B2 and the second load unit LO2 in the same state as one of the two switching states when the DC/DC converter 10 is abnormal. Accordingly, the power supply redundancy system 1c first connects the sub-battery B2 and the second load unit LO2 and causes the second load unit LO2 to execute a minimum operation or the like until it is determined which of the DC/DC converter 10 and the main battery B1 is abnormal. The switching control unit 34 specifies an abnormal location based on whether the sensor signal of the first sensor S1 returns to the normal value, and after specifying the abnormal location, sets the fourth to sixth switching units SW4 to SW6 and the ninth switching unit SW9 to the switching states described above.

In this way, according to the power supply redundancy system 1c according to the twelfth embodiment, similarly to the sixth embodiment, it is possible to reduce the size and to achieve more appropriate protection, and it is possible to guarantee an operation of the sensors S1 and S2. It is possible to take an appropriate measure after buying a time until the abnormal portion is specified.

Next, a thirteenth embodiment according to the invention will be described. A power supply redundancy system according to the thirteenth embodiment is similar as that of the twelfth embodiment, except for a part of a configuration and operation. Hereinafter, differences from the twelfth embodiment will be described.

Figure 18:
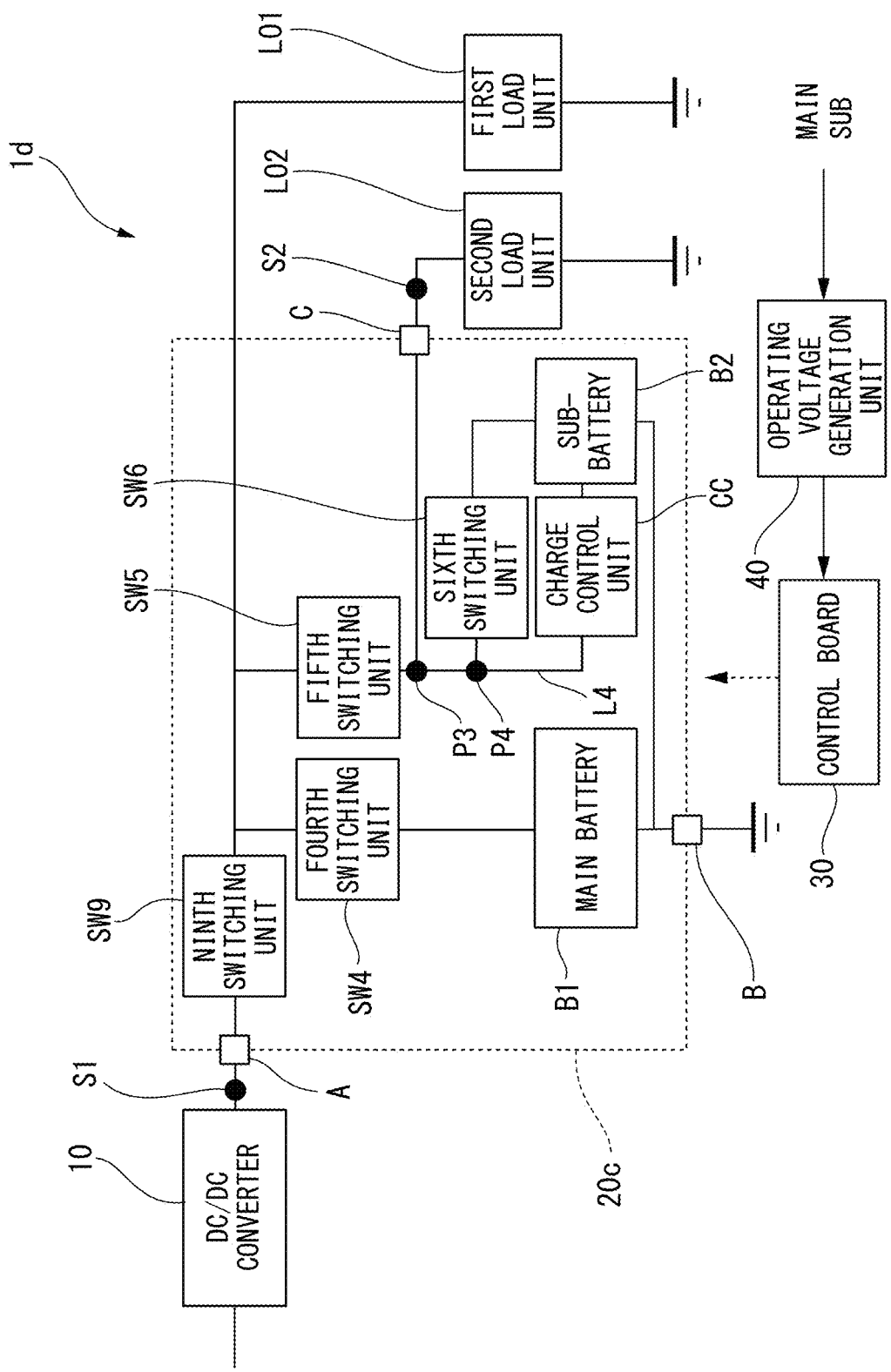
FIG. 18 is a block diagram showing a power supply redundancy system according to a thirteenth embodiment.

FIG. 18 is a block diagram showing the power supply redundancy system according to the thirteenth embodiment. A twin battery 20c according to the thirteenth embodiment includes the charge control unit CC in addition to the twin battery 20b according to the twelfth embodiment. The charge control unit CC is the same as that described in the third embodiment, and is provided on the connection line L4 that connects the connection point P4 located between the connection point P3 and the sixth switching unit SW6 to the sub-battery B2 without passing through the sixth switching unit SW6.

Next, an operation of a power supply redundancy system 1d according to the thirteenth embodiment will be described with reference to FIG. 18. First, control over the switching units SW4 to SW6 and SW9 in a normal state or an abnormal state is the same as that in the twelfth embodiment.

Further, in the thirteenth embodiment, for example, the charge control unit CC monitors a charge amount of the sub-battery B2 in a normal state. When it is determined that the sub-battery B2 does not have a charge amount sufficient to cause the second load unit LO2 to function at the time of abnormality on the main battery B1 side, the charge control unit CC charges the sub-battery B2.

In this way, according to the power supply redundancy system 1d according to the thirteenth embodiment, similarly to the twelfth embodiment, it is possible to reduce the size and to achieve more appropriate protection, and it is possible to guarantee an operation of the sensors S1 and S2. It is possible to take an appropriate measure after buying a time until the abnormal portion is specified.

Although the invention is described based on the embodiments, the invention is not limited to the embodiments, and changes may be made without departing from the gist of the invention, or the techniques of the embodiments may be combined. Further, if possible, known or well-known techniques may be combined.

For example, although the twin batteries 20 to 29 and 20a to 20c include the sub-battery B2 in the embodiments, the twin batteries 20 to 29 and 20a to 20c may be implemented by a power storage such as a large-capacity capacitor instead of the sub-battery B2 in the embodiment that does not interfere with an operation.

The abnormality determination unit 33 is mounted on the control board 30 in the embodiment. However, the invention is not particularly limited thereto, the abnormality determination unit 33 may be mounted on a higher-level ECU or the like.

What is claimed is:
1. A power supply redundancy system comprising:
a main battery that supplies power to a first load unit and a second load unit;
a sub-storage that supplies power to at least the second load unit;
a switching unit that switches a power supply path from the main battery and the sub-storage to the first load unit and the second load unit;

a control board on which a switching control unit is mounted, the switching control unit for switching and controlling the switching unit; and a housing that accommodates at least the main battery, the sub-storage, and the switching unit, wherein the control board is operable by receiving power supply from both the main battery and the sub-storage.

2. The power supply redundancy system according to claim 1, further comprising:

a sensor that detects at least one abnormal state of the main battery and the sub-storage, wherein the control board includes a reference voltage generation unit that generates a reference voltage and an operation guarantee unit that applies only the reference voltage to the sensor, and the operation guarantee unit determines whether the sensor appropriately operates based on a sensor signal when only the reference voltage is applied to the sensor.

3. The power supply redundancy system according to claim 1, further comprising:

a step-down unit that receives a voltage higher than a voltage of the main battery and the sub-storage, steps down the voltage, and supplies the voltage to a load, wherein the switching control unit connects the sub-storage and the second load unit until the switching control unit specifies which one of the main battery and a step-down unit is abnormal, in a case that an abnormal of the step-down unit is specified by the switching control unit, the switching control unit controls the switching unit to set a power supply path when the step-down unit is abnormal, and in a case that an abnormal of the main battery is specified by the switching control unit, the switching control unit controls the switching unit to set a power supply path when the main battery is abnormal.

4. The power supply redundancy system according to claim 1, further comprising:

an operating voltage generation unit in electrical communication with each of the main battery and the sub-storage, the operating voltage generation unit is configured to:

generate an operating voltage from the power supply received from either the main battery or sub-storage to; and output the operating voltage to the control board.

5. The power supply redundancy system according to claim 1, wherein the first load is outside of the housing.

* * * * *